(12) United States Patent
French

(10) Patent No.: US 7,726,454 B2
(45) Date of Patent: *Jun. 1, 2010

(54) FREE COASTER BICYCLE HUB

(75) Inventor: George French, England (GB)

(73) Assignee: Bear Corporation, Cerritos, CA (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/820,452

(22) Filed: Jun. 18, 2007

(65) Prior Publication Data

US 2007/0240960 A1   Oct. 18, 2007

Related U.S. Application Data

(63) Continuation-in-part of application No. 11/337,019, filed on Jan. 20, 2006, now Pat. No. 7,445,105.

(51) Int. Cl.
*F16D 41/24* (2006.01)
*B60B 27/04* (2006.01)

(52) U.S. Cl. .................... 192/64; 192/37; 192/41 R; 301/110.5

(58) Field of Classification Search .............. 192/37, 192/54.2, 54.5, 64
See application file for complete search history.

(56) References Cited

U.S. PATENT DOCUMENTS

| | | | |
|---|---|---|---|
| 524,652 A * | 8/1894 | Risinger | 192/41 R |
| 619,721 A | 2/1899 | Conwell | |
| 691,147 A | 1/1902 | Keating | |
| 1,551,423 A | 8/1925 | Netter | |
| 2,125,763 A | 8/1938 | Anderson | |
| 3,107,764 A * | 10/1963 | Fulton | 192/41 R |
| 3,368,834 A * | 2/1968 | Stratienko | 192/45.1 |
| 7,445,105 B2 * | 11/2008 | French | 192/64 |
| 7,559,416 B2 * | 7/2009 | French | 192/64 |

FOREIGN PATENT DOCUMENTS

GB        2 372 545 A       8/2002

OTHER PUBLICATIONS

Odyssey Reloader Hub.
KHE Rollex.

* cited by examiner

*Primary Examiner*—Rodney H Bonck
(74) *Attorney, Agent, or Firm*—Cislo & Thomas, LLP

(57) ABSTRACT

A free coaster bicycle wheel driving apparatus is provided with a clutch that employs radially acting, rather than axially acting components. An annular drive sleeve projecting inwardly from a drive sprocket is disposed within multiple transmission power transmission sleeves, which are disposed within a cylindrical wheel hub shell. The drive sleeve defines multiple cam lobes and the power transmission sleeves define multiple cam lobes and multiple pockets. When the drive sleeve cam lobes are disposed in the power transmission sleeve pockets, the driving apparatus is disengaged and allowed to free coast. Upon forward rotation of the driving apparatus, the drive sleeve cam lobes rotate toward and engage the power transmission sleeve cam lobes, thereby forcing the power transmission sleeve radially outward towards the wheel hub shell, thereby allowing the sprocket to engage the wheel hub.

16 Claims, 17 Drawing Sheets

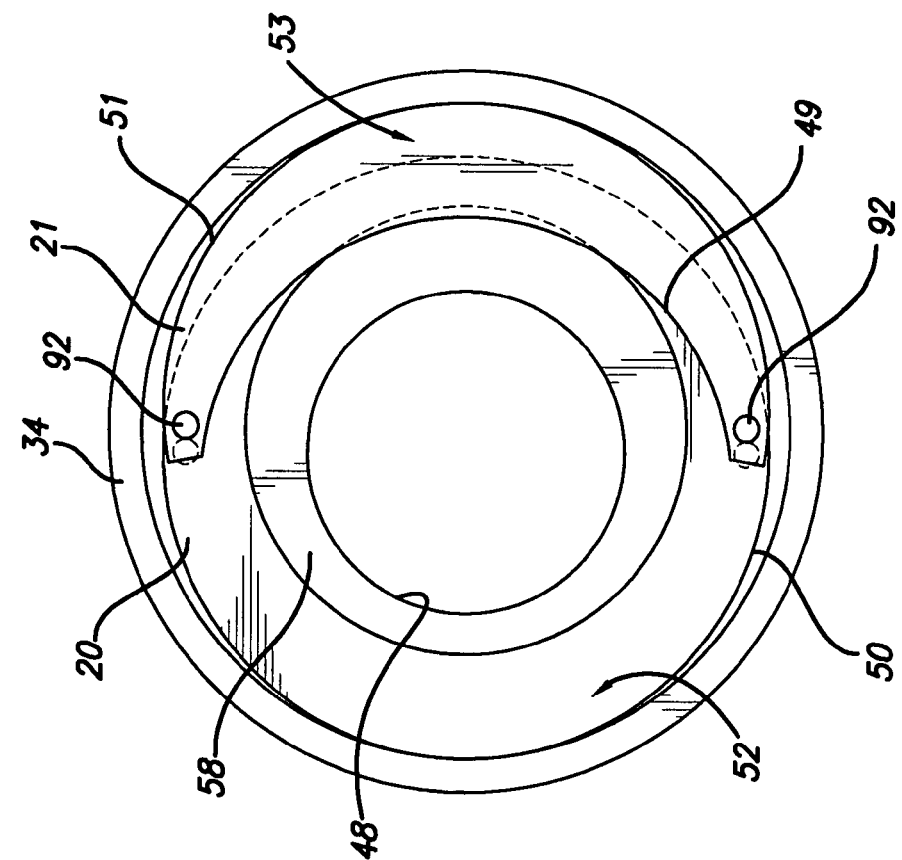
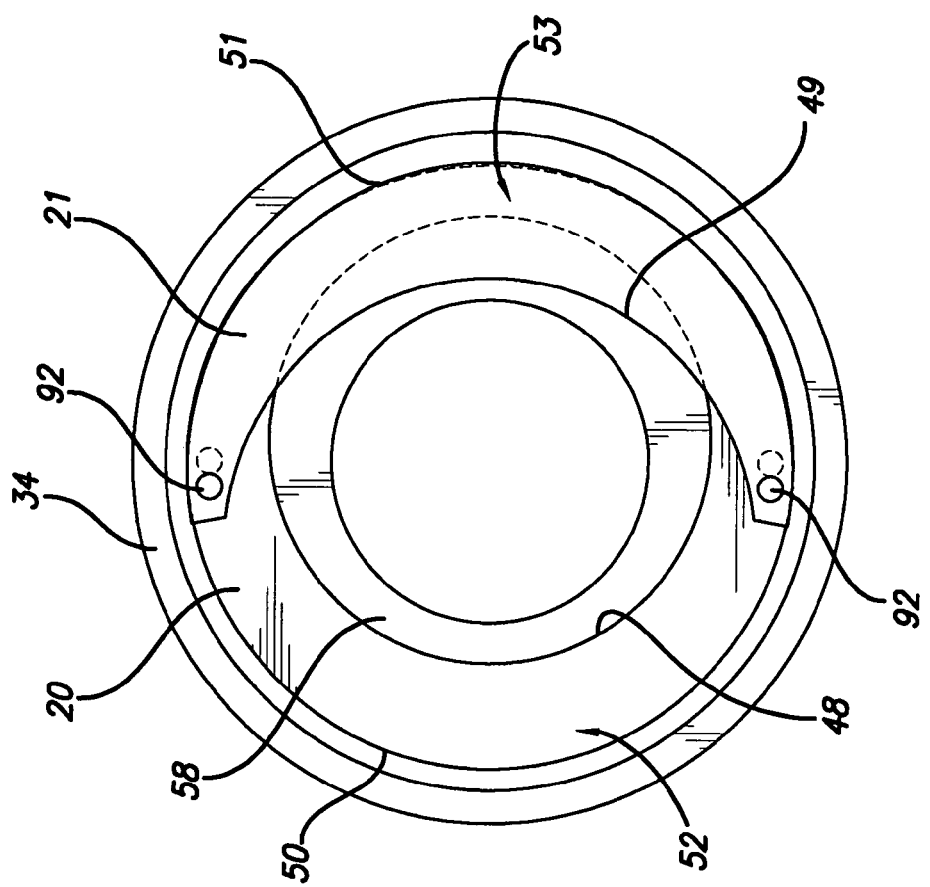

FREE COASTER BICYCLE HUB

CROSS-REFERENCES TO RELATED APPLICATIONS

This patent application is a continuation-in-part and claims the benefit of U.S. patent application Ser. No. 11/337,019 filed Jan. 20, 2006 now U.S. Pat. No. 7,445,105 for Free Coaster Bicycle Hub, which application is incorporated here by this reference.

TECHNICAL FIELD

This invention relates to a bicycle hub drive system with a clutch that allows a bicycle rider to easily engage and disengage the hub drive system of the bicycle.

BACKGROUND ART

In a conventional bicycle drive system a rider powers the bicycle by applying force through the rider's feet to the bicycle pedals which are mounted on a crank arm to a large sprocket which drives a chain loop in rotation in a forward direction. The chain is engaged with a smaller sprocket that is coupled to the hub of the rear bicycle wheel.

There is a recognized desire among many riders of trick bicycles to have a rear wheel which is capable of being entirely disengaged from the drive train. With a conventional free wheel ratchet mechanism the rider is forced to backpedal constantly to allow the rear bicycle wheel to rotate in reverse. Since the rider's weight is predominantly carried by the pedals, this constant backpedaling can upset the rider's balance. It also makes some tricks much harder to perform than would otherwise be the case.

There are conventional systems that allow a rider to disengage the drive sprocket from the hub. Such systems operate by means of a clutch hub which only engages the drive when the rider pedals in a forward direction. The hub begins disengagement from the drive sprocket when the forward force applied to the bicycle pedals ceases. Deliberate backpedaling by the rider at this point will cause the clutch to become fully disengaged. Once fully disengaged the hub is free to rotate in either direction without any effect on the positions of the bicycle pedals.

Existing bicycle clutch designs of this type typically employ a jamming cone which is moved axially to jam in a conical seat. However, the axial movement required is typically created using a drive thread. Drive threads are difficult to manufacture and are also expensive. Furthermore, the axial movement of the clutch parts creates large axial loads which are undesirable. Furthermore, the action is also generally poor.

Another problem with conventional clutches of this type is that the hub runs on a bearing fitted to the outside of the driver. Such a construction results in large bearing sizes and an undesirable "nested" bearing arrangement. Other types of bearing arrangements are impractical due to the large amount of space required by the mechanism.

While some bicycle clutches have been devised that utilize a radial movement of rollers, the intricacies of the design and the restricted space have resulted in very high contact stresses. These excessive stresses lead to premature failure and poor reliability and function. Furthermore, clutches of this type are quite expensive to produce.

DISCLOSURE OF INVENTION

The improved design of the present invention differs significantly both in structure and principle of operation from conventional bicycle clutch arrangements. Unlike prior systems, the present invention utilizes a radial movement, not an axial movement, to engage the clutch. The clutch design of the present invention uses one or more very simple pairs of eccentric surfaces to create a radial expansion on one or more sides to grip a surrounding driving surface on the inside of the hub shell. The clutch and hub components are greatly simplified and are therefore easier and cheaper to manufacture.

In one broad aspect the present invention may be considered to be a bicycle wheel hub assembly comprising a wheel hub, one or more power transmission sleeves, a sprocket, a drive sleeve, and a drag mechanism. The wheel hub of the invention is rigidly coupled to the wheel while the drive sleeve is rigidly coupled to the sprocket.

The wheel hub is formed with a wheel hub shell disposed coaxially about a wheel mounting shaft. The wheel hub shell is journaled for rotation about the wheel mounting shaft. A cylindrical, annular hub cavity is defined between the wheel hub shell and the wheel mounting shaft. At least one power transmission sleeve is disposed within the hub cavity and defines a cylindrical power transmission sleeve outer surface and a cylindrical power transmission sleeve inner surface that can be eccentric relative to the power transmission sleeve outer surface.

The sprocket has sprocket teeth projecting radially relative to a sprocket axis. The drive sleeve projects from the sprocket axially toward the hub. A central, cylindrical mounting shaft opening is defined through the drive sleeve to receive the wheel mounting shaft coaxially therewithin. The drive sleeve defines one or more cylindrical drive sleeve peripheral surfaces that can be eccentric relative to the mounting shaft opening and to each other. The drive sleeve is disposed within the power transmission sleeve. The drag mechanism is mounted on the wheel mounting shaft to retard rotation of the power transmission sleeve relative thereto.

In a preferred embodiment, each transmission sleeve inner surface defines an inner transmission sleeve axis that is radially equidistant from all locations on the circumference of the respective transmission sleeve's inner surface. Each of the drive sleeve outer surfaces defines an outer drive sleeve axis that is radially equidistant from all locations on the circumference of the respective drive sleeve outer surface.

Both the power transmission sleeves and the eccentric sections of the drive sleeve have wall thicknesses that vary between a location of maximum wall thickness and a location of minimum wall thickness due to the eccentric surfaces thereof. In a preferred embodiment the locations of maximum wall thickness and minimum wall thickness are diametrically opposed. The locations of maximum wall thickness in the drive sleeve form "lobes", as do the locations of maximum thickness of the power transmission sleeves. The location of minimum wall thickness forms a hollow or "pocket" on the inner wall surface of each power transmission sleeve. In the preferred embodiment with multiple power transmission sleeves, the pockets on the outer power transmission sleeve may be so thin as to be non-existent, giving the outer power transmission sleeves a crescent shape.

The outer, eccentric surface forming a lobe on the drive sleeve acts in cooperation with the surrounding annular inner eccentric surface of the mating power transmission sleeve which is interposed between the drive sleeve and the wheel hub. In embodiments having two such lobes, one lobe mates with the medial power transmission sleeve and one lobe mates with the outer power transmission sleeve. When the lobe of the drive sleeve is in opposition to the lobe of the respective power transmission sleeve, that is, when the lobe of the drive sleeve resides in the pocket of the corresponding power transmission sleeve, a gap or clearance exists between the outer surface of the power transmission sleeve and the surrounding cylindrical inner wall surface of the hub cavity. While the drive sleeve and the power transmission sleeve reside in this relative position of angular orientation with respect to each other, the sprocket does not rotate with the wheel, but instead "coasts."

On the other hand, when the sprocket is driven in a forward direction, in turn rotating the drive sleeve in forward rotation, the lobes of the eccentric sections of the drive sleeve approach alignment with the lobe of the respective power transmission sleeve. The thicknesses of the lobes of the eccentric drive sleeve and the eccentric power transmission sleeves are cumulative. The lobes of the drive sleeve force the surrounding respective power transmission sleeves outwardly against the inner surface of the surrounding wheel hub shell, thereby "jamming" it against the inner surface of the wheel hub shell.

In order for the eccentric portions, that is, the lobes of the drive sleeve extending axially inwardly toward the hub from the sprocket, to move toward radial alignment with the pocket of the corresponding power transmission sleeve, it is desirable that a certain amount of drag is exerted on the power transmission sleeves. For this reason at least one, and preferably a pair of, axially acting springs are provided to exert bias on the medial power transmission sleeve to resist rotation relative to the wheel mounting shaft. The springs are preferably annular disc spring washers mounted to the wheel mounting shaft and acting in an axial direction against the innermost power transmission sleeve. The annular disc spring washers provide a small force of resistance to rotation against the innermost power transmission sleeve in opposition to the much larger driving forces applied by rotation of the sprocket.

In embodiments utilizing multiple power transmission sleeves, it is preferable that all such sleeves be restrained by this drag force. In other words, all the power transmission sleeves are kept in radial alignment with one another. Preferably this is achieved by connecting adjacent power transmission sleeves with parallelogram links to restrain the angular alignment between adjacent power transmission sleeves while allowing radial movement.

Preferably also, the free coaster bicycle hub of the invention is provided with at least one shim washer disposed on the wheel mounting shaft. The use of a shim washer or plurality of shim washers allows the rider to increase or decrease the degree of compressive axial force on the spring washers as desired.

Also, it is desirable for the system to include a backpedal safety mechanism to limit counterrotation of the power transmission sleeves relative to the sprocket drive sleeve so as to keep the eccentric lobes of the drive sleeve and the corresponding power transmission sleeve in diametric opposition or in misalignment when the sprocket is counterrotated. This backpedal safety mechanism may be provided by a stud or peg on the outer surface of the drive sleeve, wherein the stud extends axially inwardly toward the wheel hub. This stud or peg moves in counterrotation with the drive sleeve and meets an axially outwardly projecting lug or tang that projects into its path of movement from the outer power transmission sleeve.

In preferred embodiments of the invention there are preferably alternative mounting locations for the stud or peg so that it is possible for the drive sleeve to "catch" the outer power transmission sleeve and move it in counterrotation therewith at different angular offsets between the lobes on the drive sleeve and on the power transmission sleeve. The rider is thereby able to determine the suitable degree of clearance that is needed at which the peg of the drive sleeve contacts the outermost power transmission sleeve during the movements of counterrotational disengagement from the hub. Furthermore, these alternative mounting locations thereby control the amount of forward pedaling rotation that is needed for the rider to reengage the drive system of the hub.

Since the power transmission sleeves are held in angular alignment by the links, limiting the movement of the inner most power transmission sleeve is sufficient to limit the movement of all power transmission sleeves.

The invention might also be considered to be a bicycle wheel clutch comprising: a wheel hub having an outer shell mounted about a wheel mounting shaft and defining a cylindrical annular hub cavity therebetween, one or more power transmission sleeves, a sprocket defining a drive axis and having a drive sleeve rigidly coupled thereto, and a drag mechanism. The wheel mounting shaft has outboard ends releasably securable to bicycle frame dropouts. The cylindrical, annular hub cavity has a cylindrical inner wall surface that is spaced in radial separation from and coaxial relative to the wheel mounting shaft. The hub shell is journaled to rotate freely relative to the wheel mounting shaft.

The power transmission sleeves are disposed within the hub cavity and, in a preferred embodiment, each has a cylindrical power transmission sleeve peripheral wall surface and a cylindrical power transmission sleeve inner wall surface of smaller diameter than, and defined eccentrically relative to, its peripheral wall surface.

The drive sleeve is rigidly coupled to the sprocket and is disposed within the power transmission sleeves. The drive sleeve has a central, cylindrical drive shaft opening defined through its structure that is disposed coaxially about the wheel mounting shaft. The drive sleeve has one or more cylindrical outer drive sleeve surfaces that are eccentric relative to the central cylindrical drive shaft opening and are preferably at equal angular spacing. The drag mechanism retards rotation of the power transmission sleeves relative to the drive sleeve.

Adjacent power transmission sleeves are held in angular alignment with one another by pivoting link members.

The free coaster bicycle wheel hub assembly works using one or more sets of two nested cams. The inner "drive" sleeve cams run on a fixed axis that is the same as the axis of the hub itself. The outer surfaces of the drive sleeve are eccentric and therefore have axes that are offset from the axis of the hub and are a set distance from the axis of the hub. This set distance establishes the extent of the eccentricity of the drive sleeve outer surfaces.

Similarly, the outer cams, or power transmission sleeves, run directly on the outer surfaces of the drive cam. The axis of the inner surface of each power transmission sleeve, and therefore the axis it turns on, is the same as the axis of the outer surface of the drive cam or drive sleeve which it runs on. The axes of the outer surfaces of the drive cams or drive sleeve are the constraints about which the power transmission sleeves turn. The common axis of each drive sleeve peripheral surface and its power transmission sleeve inner surface orbits about the hub axis of rotation.

Since the power transmission sleeves turn about the axis of the corresponding outer surface of the drive sleeve, the axis of the outer surface of the power transmission sleeve is a fixed distance from the axis of the outer surface of the drive sleeve. This fixed distance establishes the extent of eccentricity of the power transmission sleeves.

The axes of the peripheral surfaces of the power transmission sleeves, and the main hub axis, which is also the main drive sleeve axis and the axis of the inner surface of the drive sleeve, preferably do move relative to one another.

Because the inner and outer surface of each drive sleeve section are not coaxial to each other, each drive sleeve section forms a drive sleeve cam lobe where its wall thickness is greatest. Similarly, since the inner and peripheral surfaces of each power transmission sleeve are not coaxial to each other, each power transmission sleeve forms a power transmission sleeve cam lobe where its wall thickness is greatest.

When the power transmission sleeve cam lobes are in diametric opposition to their drive sleeve cam lobes, considered with respect to the drive shaft and hub axis of rotation, a clearance exists between the power transmission sleeves' peripheral wall surfaces and the inner wall surface of the hub cavity. Under this condition the power transmission sleeves are disengaged from a driving relationship relative to the hub. When the power transmission sleeve cam lobes depart from diametric opposition relative to the drive sleeve cam lobes, the power transmission sleeves' peripheral wall surfaces are forced by the drive sleeve sections into frictional engagement with the inner wall surface of the hub cavity.

In still another aspect the invention may be considered to be a free coaster bicycle wheel driving apparatus comprising: a driving member; an annular drive sleeve; one or more power transmission sleeves, each mounted about the drive sleeve; a bicycle wheel hub; and a drag mechanism. The driving member includes a sprocket for engagement with a bicycle chain and defines a central drive axis. The annular drive sleeve is rigidly joined to the sprocket and projects axially inwardly from the sprocket. The annular drive sleeve has a cylindrical inner wall surface coaxial with the drive axis and one or more larger diameter cylindrical outer wall drive surfaces that are eccentric relative to the cylindrical inner wall surface thereof. The power transmission sleeves each have a cylindrical inner wall surface and a larger diameter cylindrical outer wall surface that is eccentric relative to the cylindrical inner wall surface thereof. The inner wall surface of each power transmission sleeve surrounds and resides in contact with part of the outer wall surface of the drive sleeve.

The bicycle wheel hub has a central cylindrical wheel mounting shaft that projects outwardly through the sprocket and resides in coaxial alignment with the central drive axis. The wheel mounting shaft is radially encircled by the inner wall surface of the drive sleeve. The hub has a cylindrical, annular outer shell freely rotatable about the wheel mounting shaft. The shell defines a cylindrical annular cavity therewithin with a cylindrical inner hub wall surface that is coaxial relative to the central drive axis.

The power transmission sleeves are disposed within the cavity in the hub shell and the drive sleeve is disposed within the power transmission sleeves. The power transmission sleeves are shiftable radially relative to the central drive axis so that the outer wall surfaces of the power transmission sleeves engage the inner hub wall surface and the outer wall surfaces of the drive sleeve engage the inner wall surfaces of the power transmission sleeves. The hub is thereby engaged with the sprocket when the cam lobes of the mating eccentric surfaces depart from an angular offset of one hundred eighty degrees and advance toward radial alignment with each other.

On the other hand, the power transmission sleeves rotate freely within the cavity in the hub shell when the mating eccentric surfaces approach diametrical opposition relative to each other. The hub is disengaged and rotates freely about the axle when the mating eccentric surfaces approach diametrical opposition relative to each other. The drag mechanism restrains rotation of the power transmission sleeves relative to the wheel mounting shaft.

Although the cam lobes and pockets have been described as being defined by eccentricity between inner and outer surfaces of the power transmission sleeve and drive sleeve, the cam lobes and pockets can be defined simply as an area of maximum thickness and an area of minimum thickness, respectively, without regards to eccentricity.

The invention may be described with greater clarity and particularity by reference to the accompanying drawings.

BRIEF DESCRIPTION OF DRAWINGS

FIG. 15A is another side view of the multiple power transmission sleeves in the disengaged position, without showing the drive sleeve for simplicity.

FIG. 15B is another side view of the multiple power transmission sleeves in the engaged position, without showing the drive sleeve for simplicity.

BEST MODE FOR CARRYING OUT THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
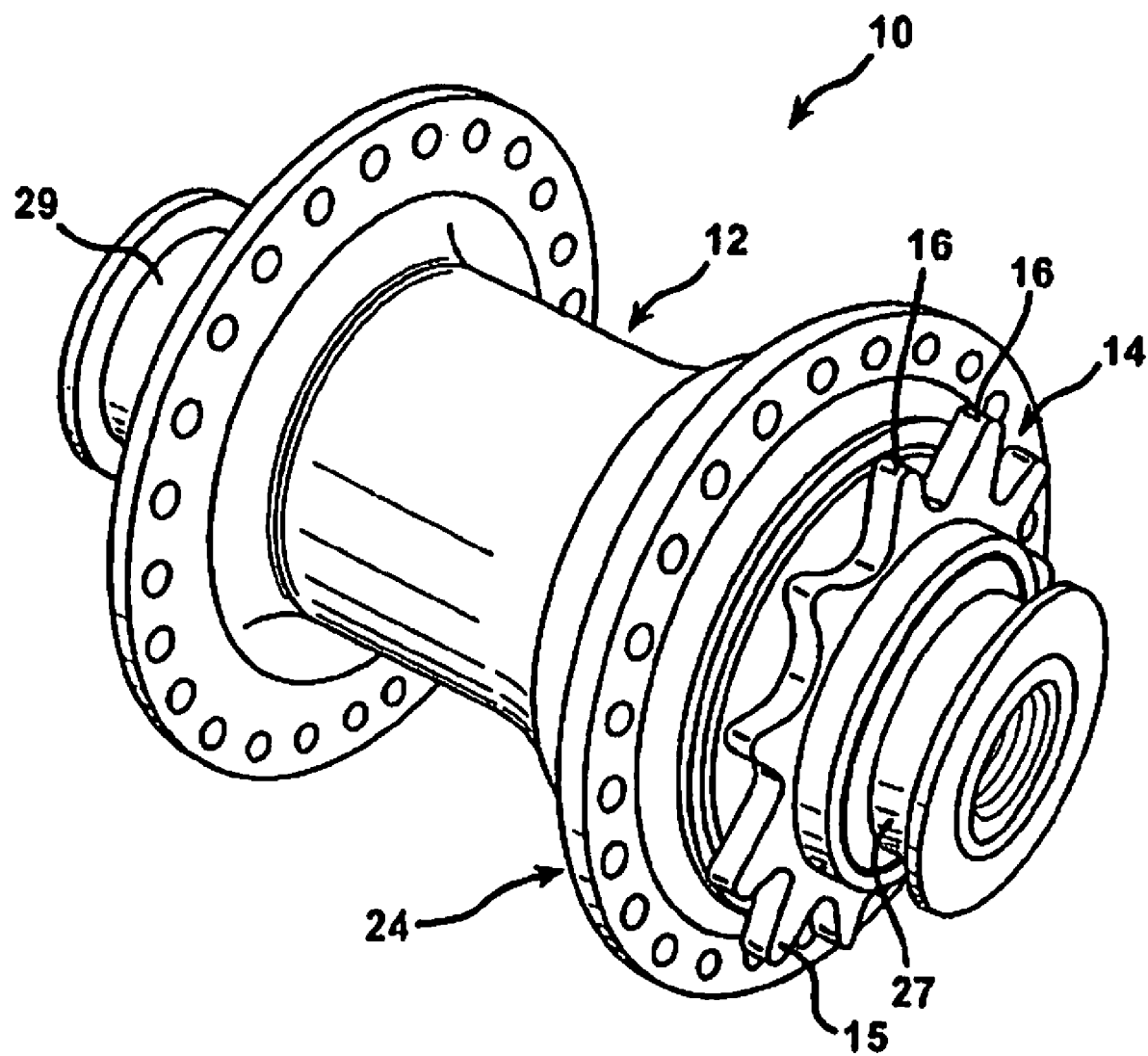
FIG. 1 is a perspective view of an embodiment of a fully assembled free coaster bicycle wheel driving apparatus constructed according to the invention.
Figure 8:
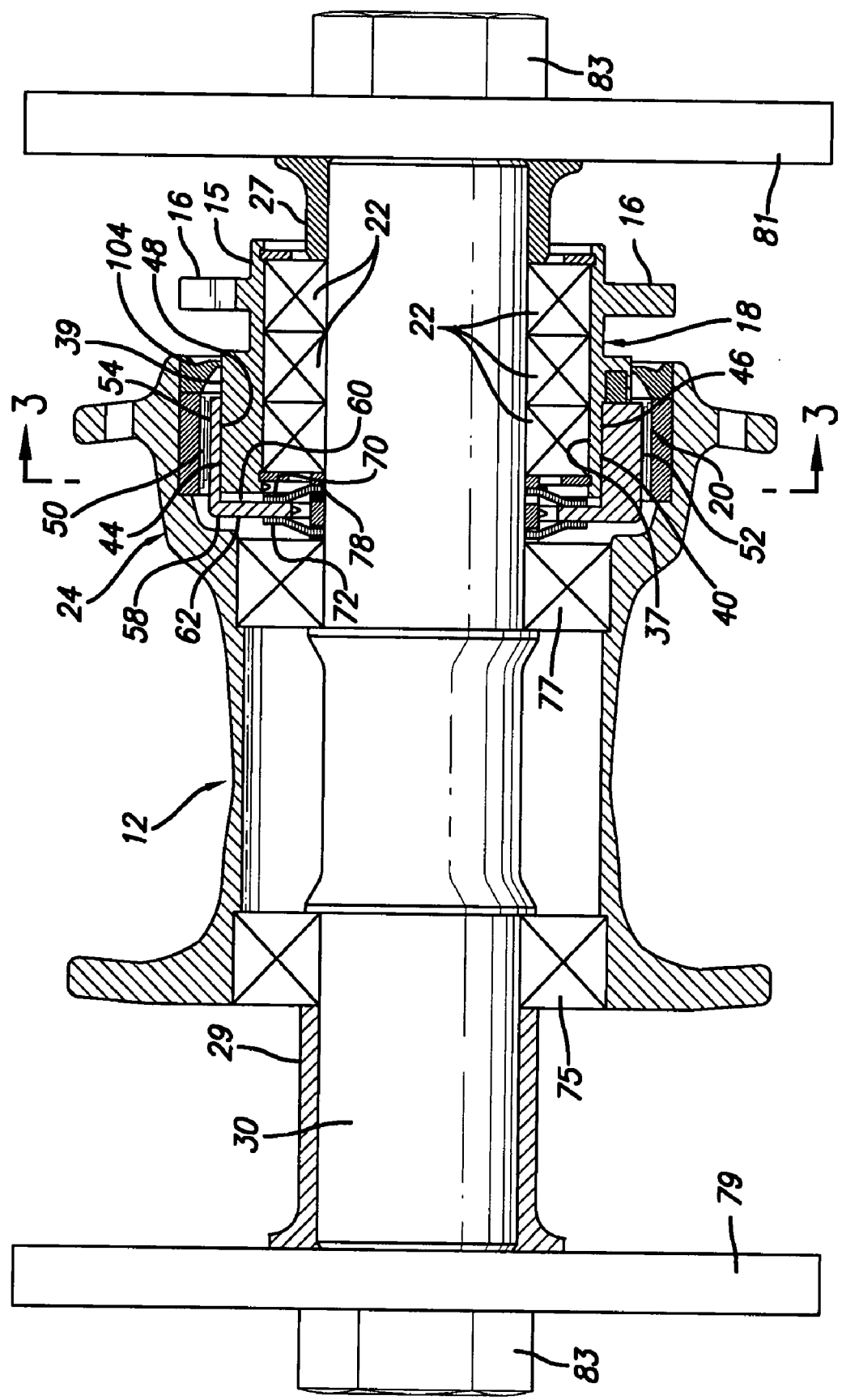
FIG. 8 is a transverse schematic sectional view illustrating the entire axle assembly, including the free coaster bicycle drive apparatus of the invention.
Figure 9:
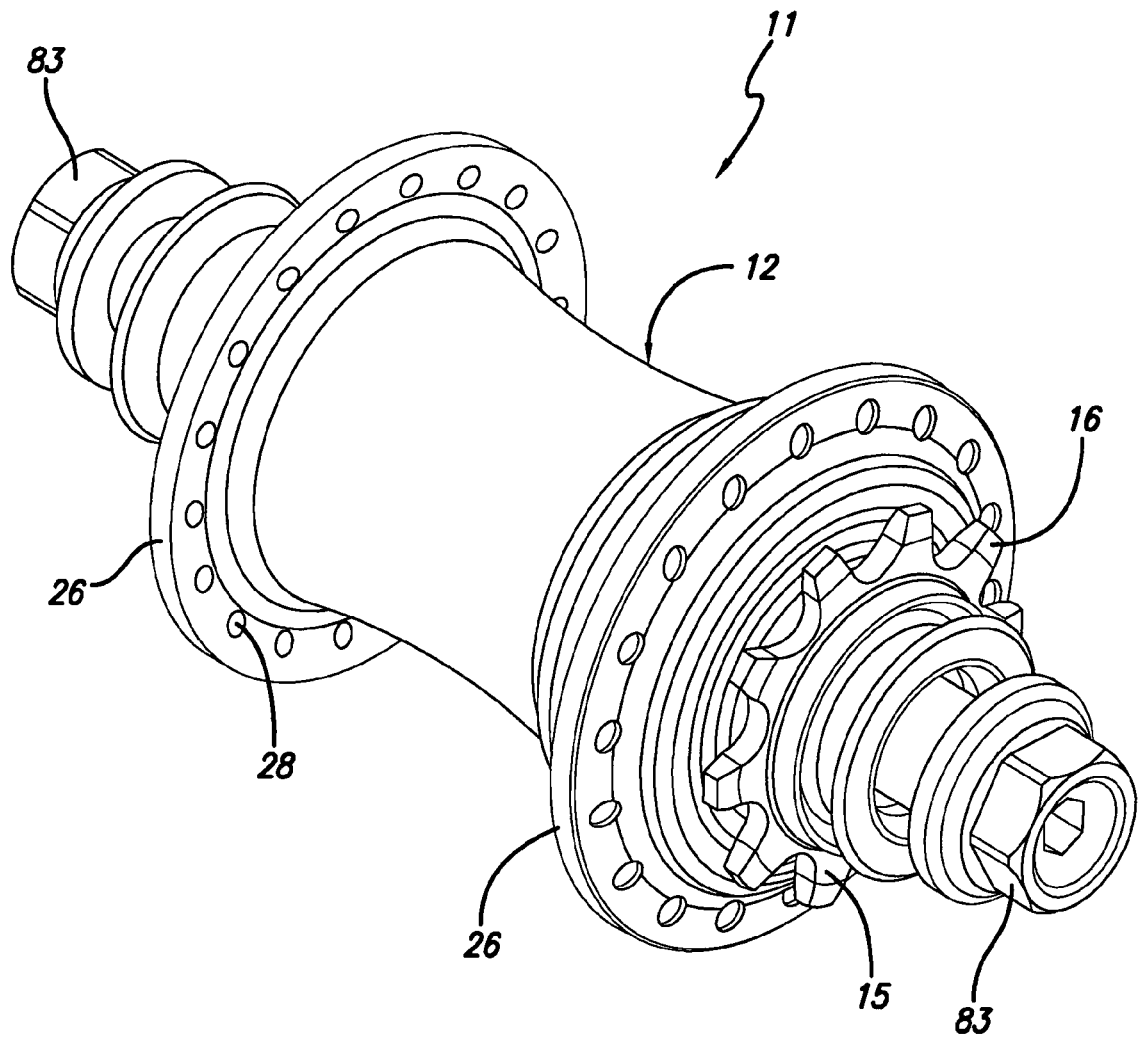
FIG. 9 is a perspective view of another embodiment of a fully assembled free coaster bicycle wheel driving apparatus constructed according to the invention.

FIG. 1 illustrates a free coaster bicycle wheel driving apparatus indicated generally at 10. The driving apparatus is a bicycle wheel hub assembly that employs a bicycle wheel clutch. The driving apparatus is comprised of a wheel hub 12 and a sprocket assembly 14, as well as certain additional component members illustrated in FIG. 2. Specifically, the sprocket assembly 14 includes a sprocket 15 having conventional teeth 16 that engage a bicycle chain, as well as a drive sleeve 18. A central, cylindrical wheel mounting shaft opening 31 is defined through the sprocket assembly 14 to receive the wheel mounting shaft 30 coaxially therewithin. The drive sleeve 18 is rigidly joined to the sprocket 15 and extends axially therefrom in an inboard direction toward the wheel hub 12. The driving apparatus 10 is further provided with a power transmission sleeve 20, three longitudinally aligned, sealed cartridge bearings 22, and a drag mechanism 94 illustrated in FIG. 6. Outboard axle spacer collars 27 and 29 are provided to properly position the hub assembly components on the wheel mounting shaft 30. The axle spacing collars 27 and 29 are embraced between the bicycle frame dropouts 79 and 81 and prevent shifting of the hub assembly components on the mounting shaft 30, as illustrated in FIG. 8. Conventional axle fasteners 83 secure the bicycle wheel driving apparatus 10 in position between the frame dropouts 81 and 79.

The bicycle wheel hub 12 is a conventional structure having a cylindrical, annular, generally barrel-shaped shell 24, the opposing ends of which terminate in radially outwardly projecting annular flanges 26 having apertures 28 arranged about their peripheries to receive the radial inboard ends of bicycle spokes. The hub shell 24 is rotatably mounted about a central, cylindrical wheel mounting shaft 30, the outboard ends of which are internally threaded as illustrated and which may be releasably secured to conventional bicycle frame dropouts 79 and 81, as illustrated in FIG. 8.

Figure 12:
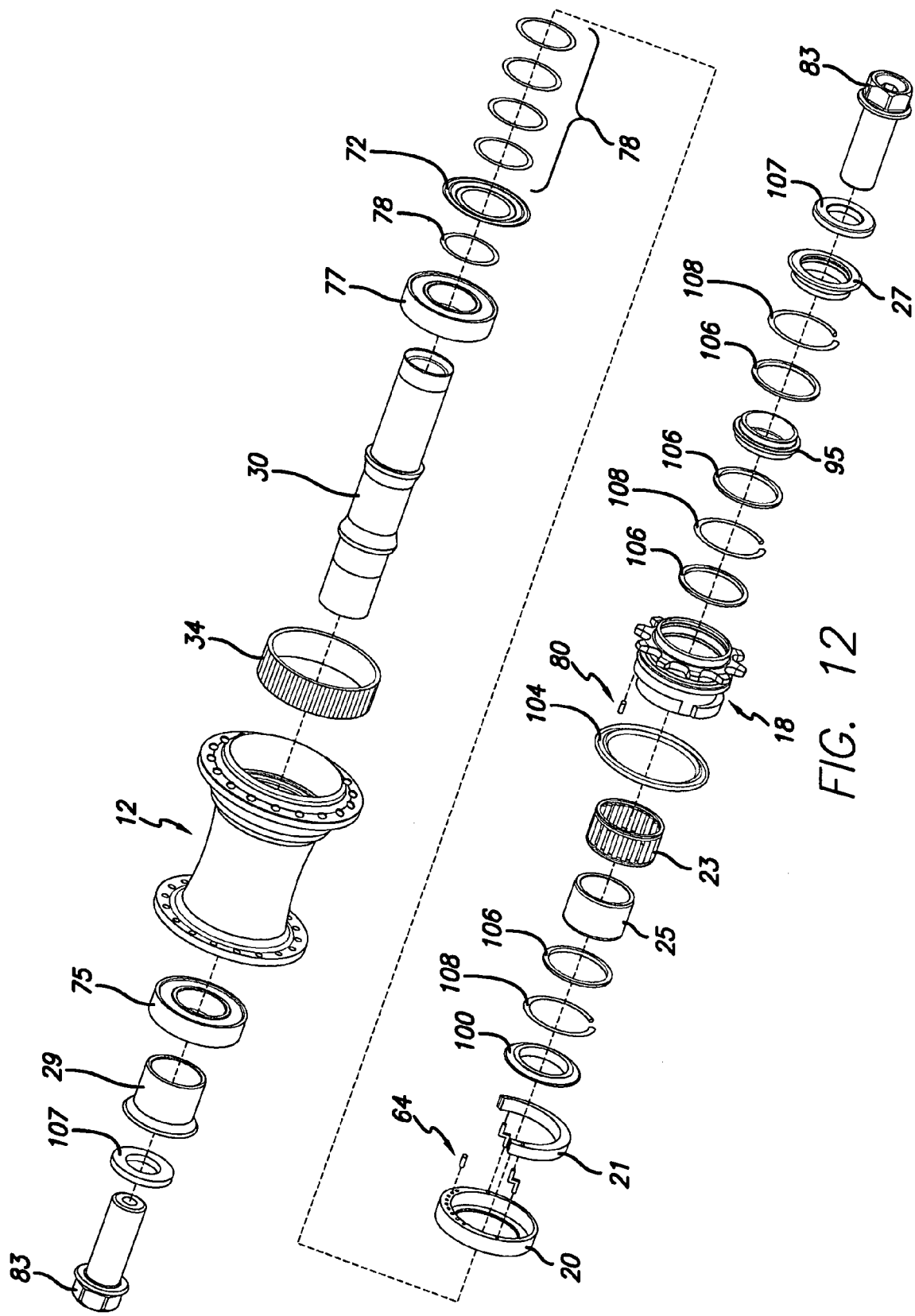
FIG. 12 is an exploded perspective view of the driving apparatus of FIG. 9.
Figure 13:
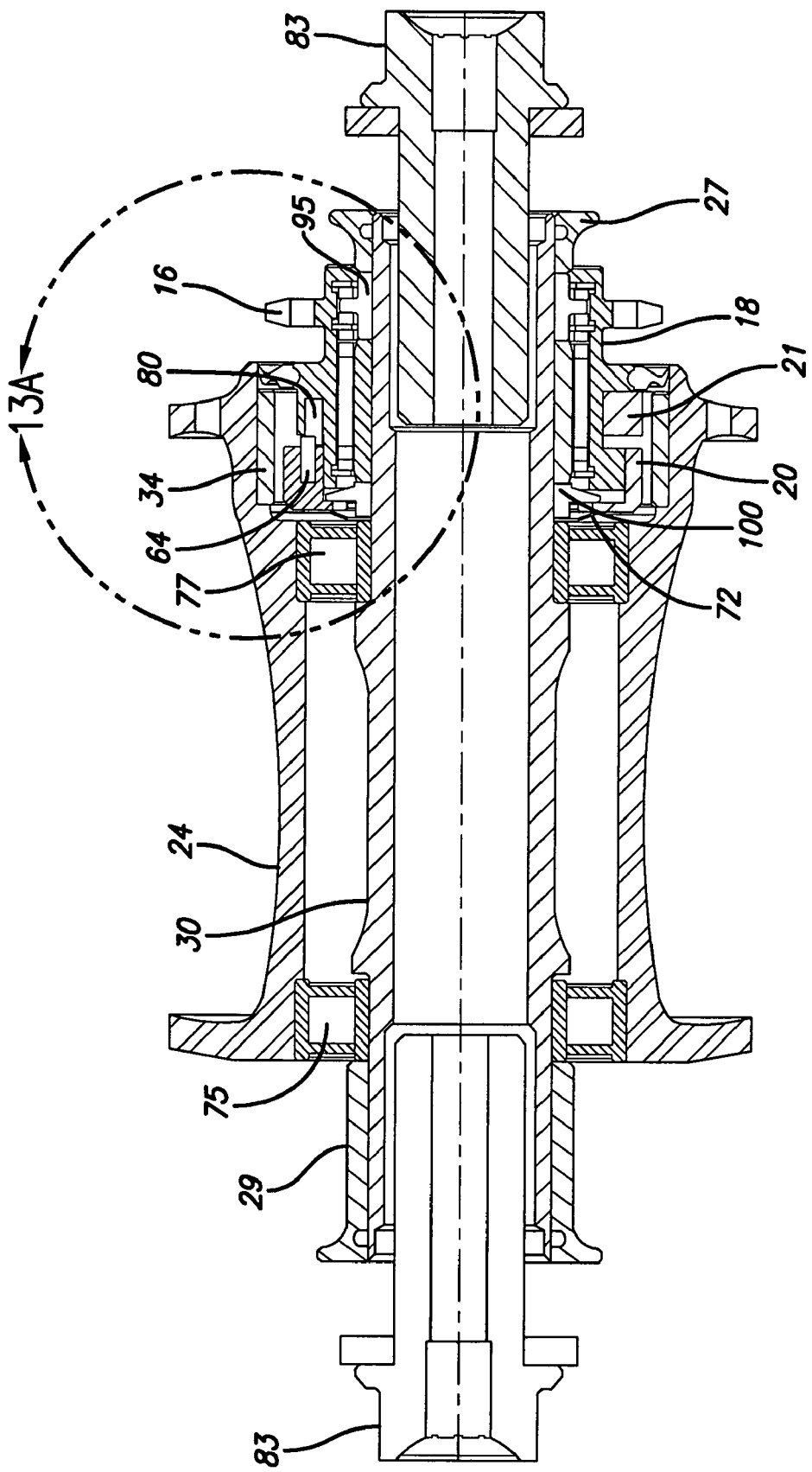
FIG. 13 is a longitudinal sectional detail illustrating the entire axle assembly, drag mechanism and driving apparatus of the fully assembled free coaster bicycle wheel apparatus of FIG. 9.
Figure 13A:
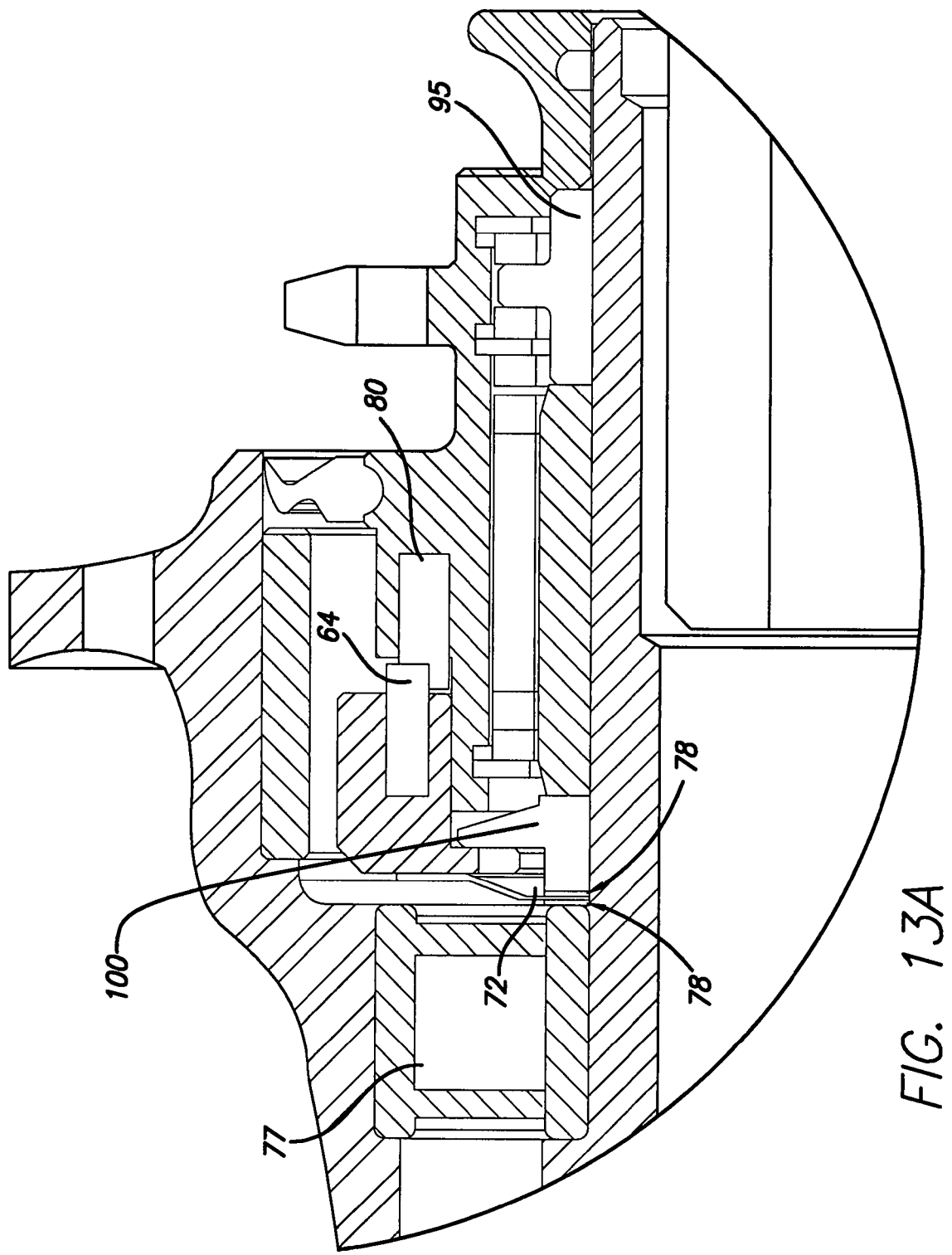
FIG. 13A is a close up cross-sectional detail illustrating the area indicated as 13A in FIG. 13.

A cylindrical annular hub cavity 32 is defined within the hub shell 24 and about the wheel mounting shaft 30. The hub cavity 32 has a cylindrical hub shell liner 34 that resides in radial separation from the wheel mounting shaft 30. The hub shell liner 34 may comprise resistance enhancing means. For example, the hub shell liner 34 may comprise ridges. The hub shell 24 is journaled to rotate freely about the wheel mounting shaft 30 in a conventional manner by hub shell bearings 75, 77 as shown in FIG. 12.

The sprocket assembly 14 is mounted coaxially about the wheel mounting shaft 30 and either or both of these members may be considered to define a central drive axis of hub and wheel rotation 36. The cylindrical annular cavity 32 within the hub shell 24 is coaxial relative to the central drive axis 36. The annular drive sleeve 18 is rigidly joined to the sprocket 15, so that the sprocket assembly 14 turns in rotation as a unit. The drive sleeve 18 projects axially inwardly from the sprocket 15 and toward the hub 12. A thrust locator 95 provides axial location, stabilizing the sprocket 15 and drive sleeve 18 assembly. A lip seal 104 is placed on the drive sleeve 18 to prevent dirt and dust from getting into the annular cavity of the hub shell 32 and the drive sleeve 18. The sprocket 15 is not illustrated in FIGS. 4 and 5 so as to allow illustration of the operative components of the clutch mechanism of the invention in those drawing figures.

Figure 3:
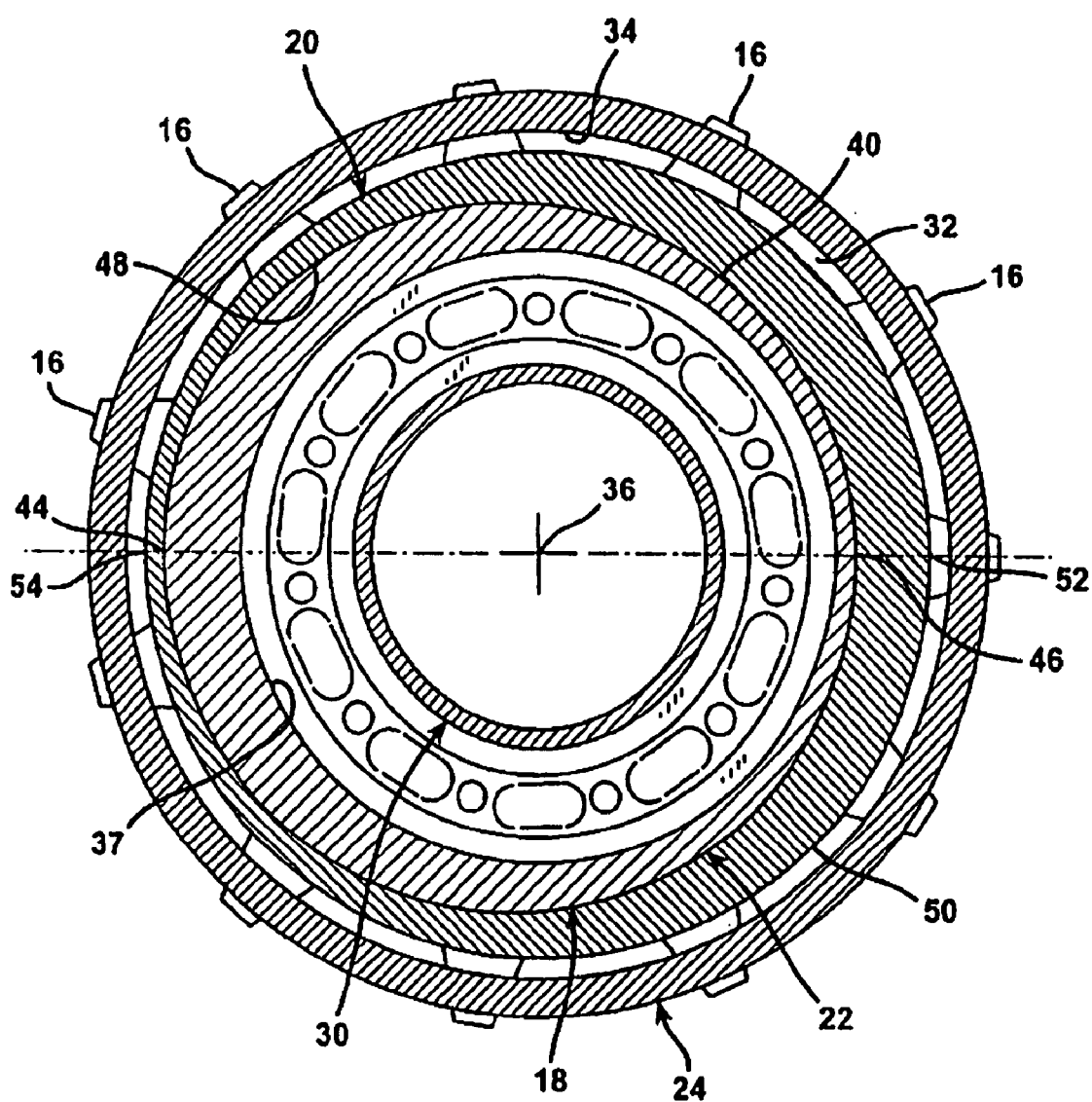
FIG. 3 is a cross-sectional detail taken along the lines 3-3 in FIG. 8 illustrating the relative alignment of the component parts of the wheel driving apparatus in a free coasting condition.
Figure 3A:
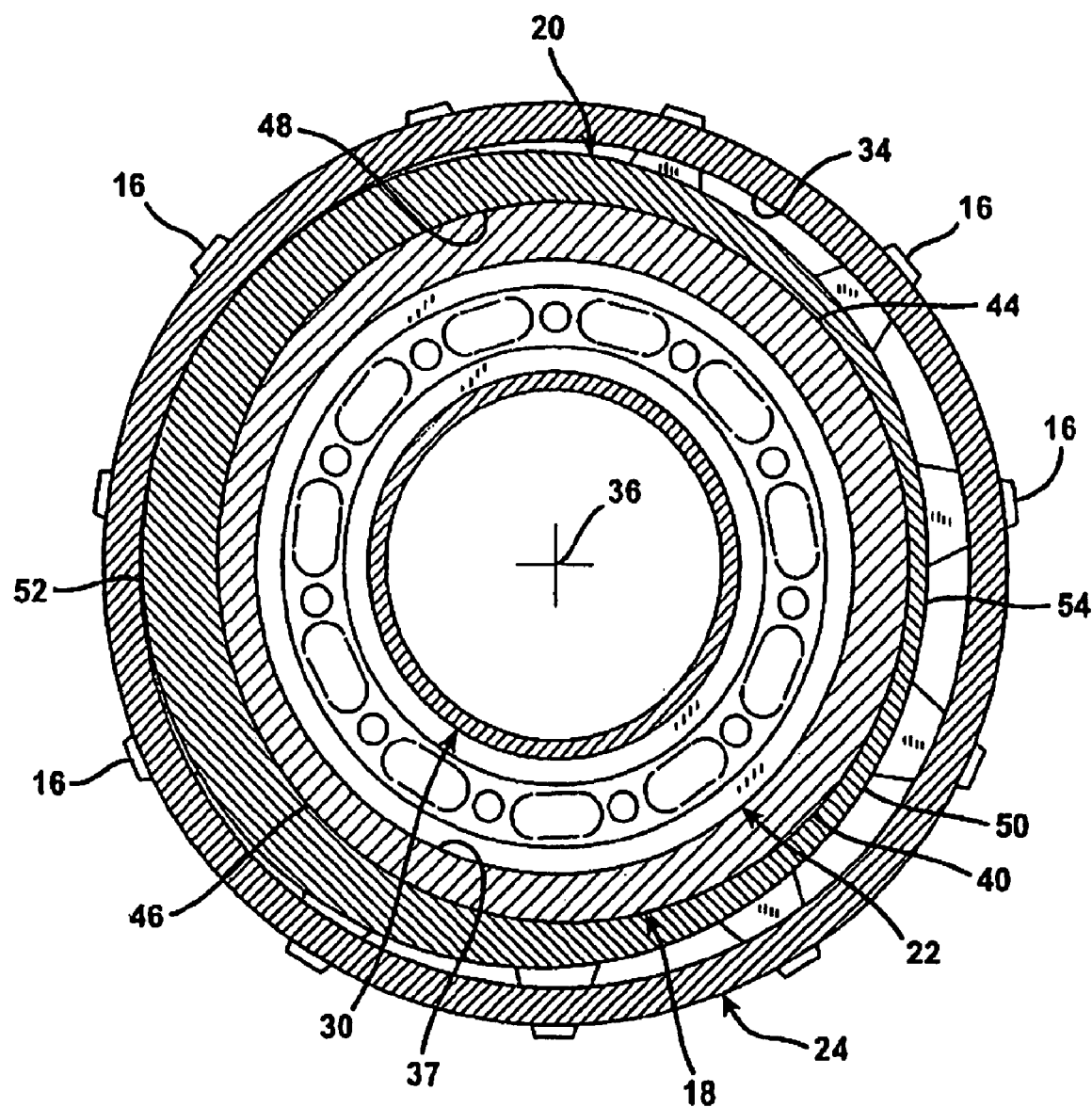
FIG. 3A is a cross-sectional detail illustrating the relative alignment of the component parts of the wheel driving apparatus in a condition in which the sprocket is engaged in a driving relationship with the hub.

As shown in FIG. 3 and 3A, the annular drive sleeve 18 may have a cylindrical inner wall surface 37 that is coaxial with the drive axis 36 and a larger diameter cylindrical outer wall drive sleeve surface 40 that is eccentric relative to the cylindrical inner wall surface 37. The central, cylindrical drive shaft opening 31 that is defined through the drive sleeve 18 is disposed coaxially about the wheel mounting shaft or hub axle 30.

The drive sleeve 18 is a composite structure that houses conventional, sealed cartridge bearing units 22 that are coaxial with the hub axle 30. The cartridge bearings 22 are seated within the drive sleeve 18, which serves as a jacket for them. The inner, central, cylindrical surface 37 of the drive sleeve 18 tightly grips the outer surfaces of the cartridge bearings 22. The outer surface 40 of the drive sleeve 18 is eccentric relative to its inner surface 37 and is eccentric relative to the bearings 22. The bearings 22 are held in the drive sleeve 18, and are coaxial with the hub axle 30.

In another embodiment, the bearings may be a roller bearing 23. The roller bearings may be seated within the drive sleeve 18. An inner bearing sleeve 25 may be seated within the roller bearings to serve as a sleeve between the wheel mounting shaft 30 and the roller bearings.

The drive sleeve 18 defines an annular wall between its inner surface 37 and its outer surface 40 that varies in thickness between a location of maximum wall thickness, indicated in the drawings at 44, and a location of minimum wall thickness indicated at 46. The location of maximum wall thickness 44 may be considered to be a cam lobe. The location of minimum wall thickness 46 may be located diametrically opposite the cam lobe formed at the location of maximum wall thickness 44. In one embodiment, the variation in wall thickness is due to the eccentricity of the surfaces 38 and 40 relative to each other. The diametric opposition of the cam lobe 44 from the location of minimum thickness 46 is an accurate description considered both with respect to the axis of alignment of the cylindrical inner drive sleeve surface 37, which is the axis 36, and with respect to the axis of the cylindrical outer drive sleeve surface 40.

The power transmission sleeve 20 is formed as a cup-shaped member having a cylindrical inner wall surface 48 and a larger diameter cylindrical outer wall surface 50. The outer wall surface 50 may comprise outer wall ridges to "catch" the inner surface ridges of the hub cavity 32 directly or to the hub shell liner 34 to facilitate engagement of the power transmission sleeve 20 with the wheel hub 12. The cylindrical inner wall surface 48 is eccentric relative to the cylindrical outer wall surface 50 of the power transmission sleeve 20. The drive sleeve 18 is disposed within and surrounded by the power transmission sleeve 20 and the power transmission sleeve 20 is disposed within the hub cavity 32 and surrounded by the hub shell 24.

In another embodiment, a hub shell liner 34 is disposed within the hub cavity 32 and the power transmission sleeve 20 is disposed within the hub shell liner 34. The power transmission sleeve 20 can engage the hub 12 via the hub shell liner 34.

The power transmission sleeve 20 has a wall thickness that varies between a location of maximum wall thickness 52, which may be considered to be a cam lobe and a location of minimum wall thickness indicated at 54 located diametrically opposite the lobe 52, considered with respect to the drive axis 36. The location of minimum wall thickness 54 on the inner surface 48 in the power transmission sleeve 20 may be considered to form a "pocket."

Figure 6:
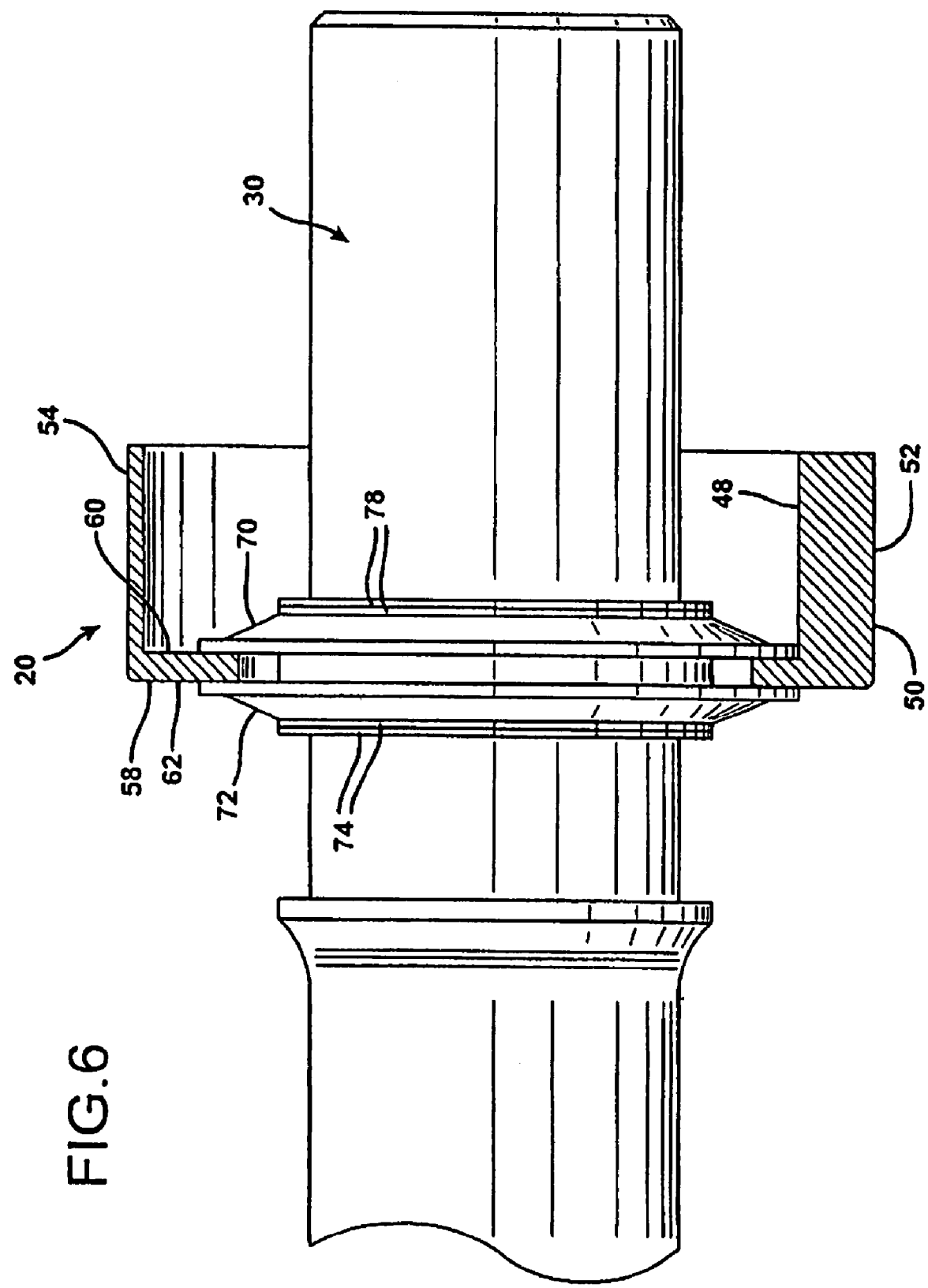
FIG. 6 is a longitudinal view illustrating the drag mechanism of the driving apparatus of FIGS. 1-5, shown in isolation from the sprocket assembly.

The power transmission sleeve 20 has an annular flange 58 at its inboard end that is directed radially inwardly from its outer surface 50. The annular flange 58 has an outboard annular surface 60 and an inboard annular surface 62. The surfaces 60 and 62 oppose each other and face in opposite axial directions, as indicated in FIG. 6.

Figure 2:
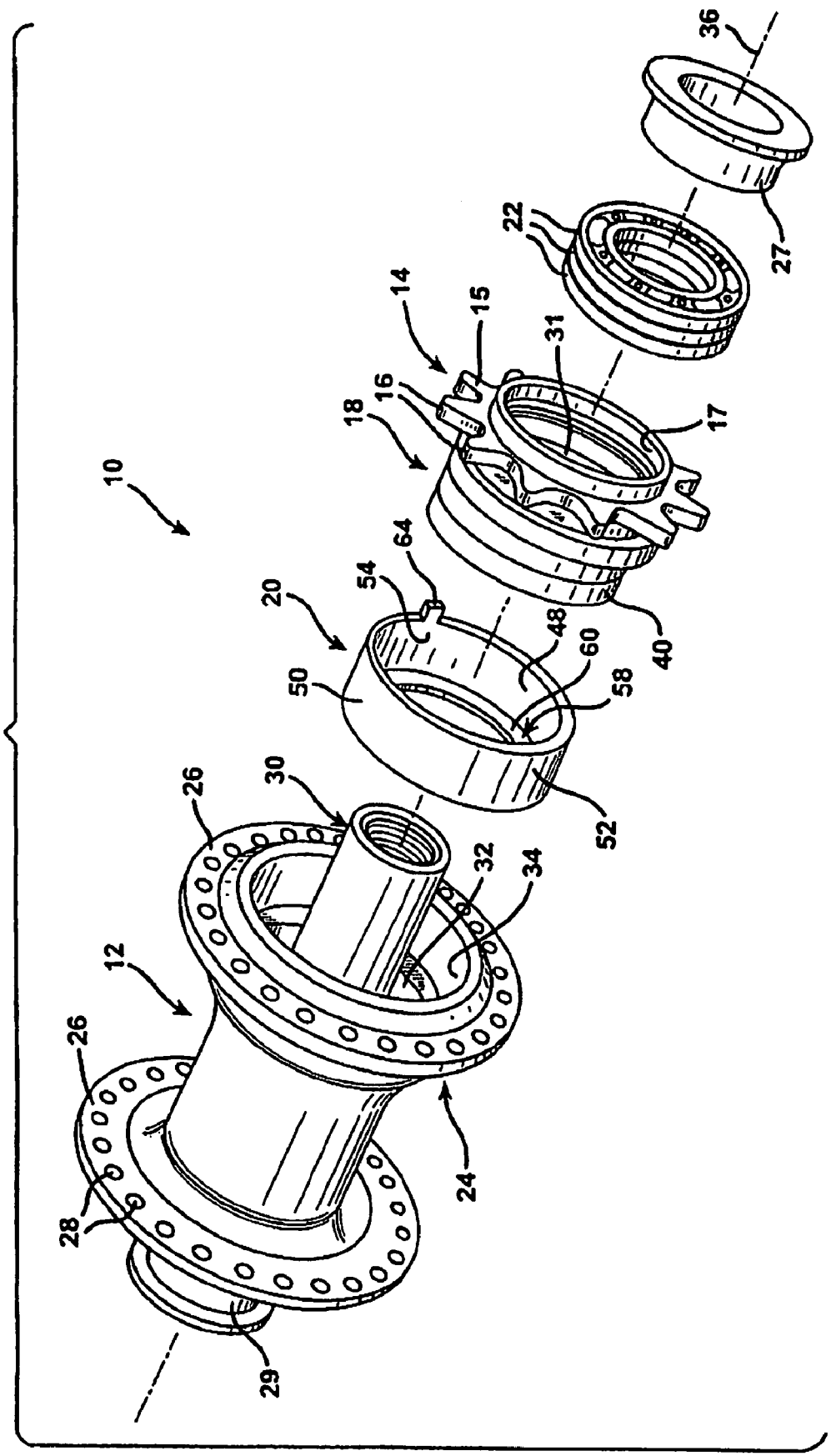
FIG. 2 is an exploded perspective view of the driving apparatus of FIG. 1.

The power transmission sleeve 20 also has an axially projecting lug or tang 64 directed toward the sprocket 15, as illustrated in FIG. 2. In a preferred embodiment, the tang 64 is formed on the power transmission sleeve 20 at its location of minimum wall surface 54. However, the tang 64 may be located anywhere along the power transmission sleeve 20.

Figure 10:
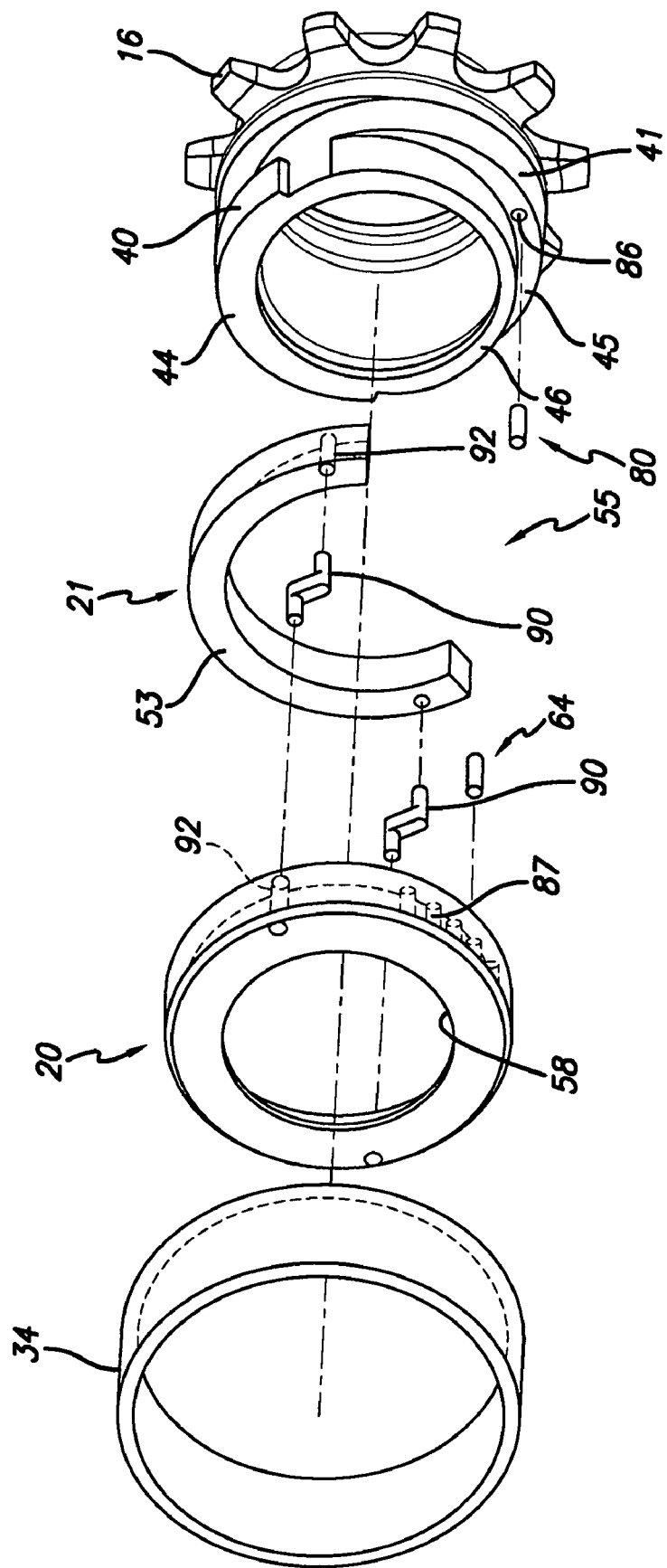
FIG. 10 is a perspective view of multiple power transmission sleeves and drive sleeve assembly.
Figure 11:
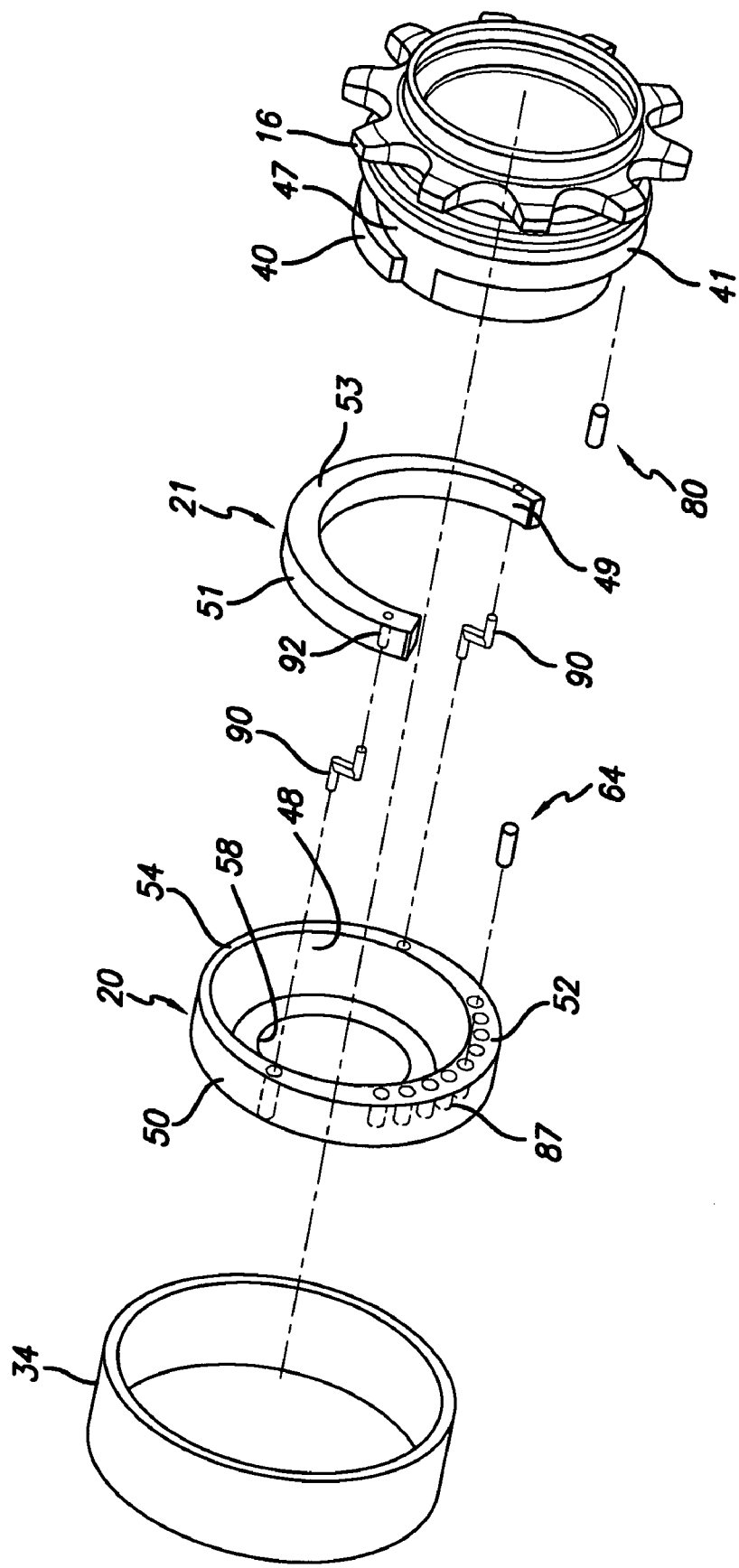
FIG. 11 is another perspective view of the multiple power transmission sleeves and drive sleeve assembly.

In another embodiment the power transmission sleeve 20 may have a hole or recess 87 into which a lug or tang 64 can be removably inserted as shown in FIGS. 10 and 11. In a preferred embodiment, the power transmission sleeve 20 may contain a plurality of recesses 87 so that the tang 64 can be placed in a variety of positions along the power transmission sleeve 20. These adjustable positions for the tang 64 in conjunction with a backpedal safety stud or peg 80 projecting from the drive sleeve 18 determine the degree of rotation needed to engage or disengage the drive system. In other words, the position of the tang 64 increases or decreases the rotation needed before the tang 64 hits the backpedal safety stud 80.

The power transmission sleeve 20 is disposed within the cavity 32 in the hub shell 24 and the drive sleeve 18 is disposed within the power transmission sleeve 20. The power transmission sleeve inner wall surface 48 thereby surrounds and resides in contact with the outer wall surface 46 of the drive sleeve 18.

The central, cylindrical wheel mounting shaft 30 projects outwardly through the sprocket assembly 14 and resides in coaxial alignment with the central drive axis 36. The wheel mounting shaft 30 is radially encircled by the inner wall surface 37 of the drive sleeve 18.

To facilitate the drag mechanism 94 the power transmission sleeve is a cup-shaped member with an annular flange 58 directed radially inwardly from the first outer surface thereof, and having opposing surfaces facing in opposite axial directions.

As shown in FIG. 6, the drag mechanism is formed by shim spacers 78 and a pair of cylindrical annular spring washers 70 and 72 that are mounted upon opposite sides of the radially directed power transmission flange 58 of the power transmission sleeve 20. As shown in FIG. 8, the spring washers 70 and 72 are limited in axial movement in an inboard direction by hub shell bearing 77 and cartridge bearings 22 that are installed on the wheel mounting shaft 30 and clamped between the dropouts of the frame. The periphery of the spring washer 72 faces the inboard surface 62 of the power transmission flange 58 and resides in contact therewith. The other annular spring washer 70 faces in an opposite, inboard direction. Its periphery faces and resides in contact with the surface 60 of the power transmission sleeve flange 58.

The spring washers 70 and 72 are held in a compressed condition against the opposing faces of the flange 58 by the total assembly of the hub upon the wheel mounting shaft 30, which is then installed in the bicycle frame dropouts 79 and 81, as illustrated in FIG. 8. The spring washers 70 and 72 thereby exert a compressive force from opposite axial directions against the power transmission sleeve flange 58 so as to exert a light drag on the power transmission sleeve 20.

The annular spring washers 70 and 72 are biased to exert an axial force against the power transmission sleeve 20 from opposite axial directions. The disc springs 70 and 72 bear against the power transmission sleeve 20 in a direction parallel to the wheel mounting shaft 30. The shim washers 78 may be selectively positioned by the rider upon the wheel mounting shaft 30 to vary the magnitude of force exerted by the disc spring washers 70 and 72 against the annular flange 58. To reduce this force the shim washers 78 may be repositioned in an inboard direction to an axial location between the spring washers 70 and 72. That is, the magnitude of the compressive force may be increased by rearranging one or more of the annular shim washers 78 from a position between the spring 70 and the sealed cartridge bearings 22.

The springs 70 and 72 also stabilize the axial location of the lobe 52 of the power transmission sleeve 20 to prevent it from wandering in an axial direction. The spring washers 70 and 72 and the spacer or spacers 78 are clamped to the wheel mounting shaft 30 by the bearings and spacers and are ultimately held in place by the end bolts 83 through the bicycle frame dropouts.

In another embodiment, the outer spring washer 70 can be replaced by a cam locator 100 as shown in FIG. 12. The cam locator 100 helps provide stability for the first power transmission sleeve 20.

Figure 4:
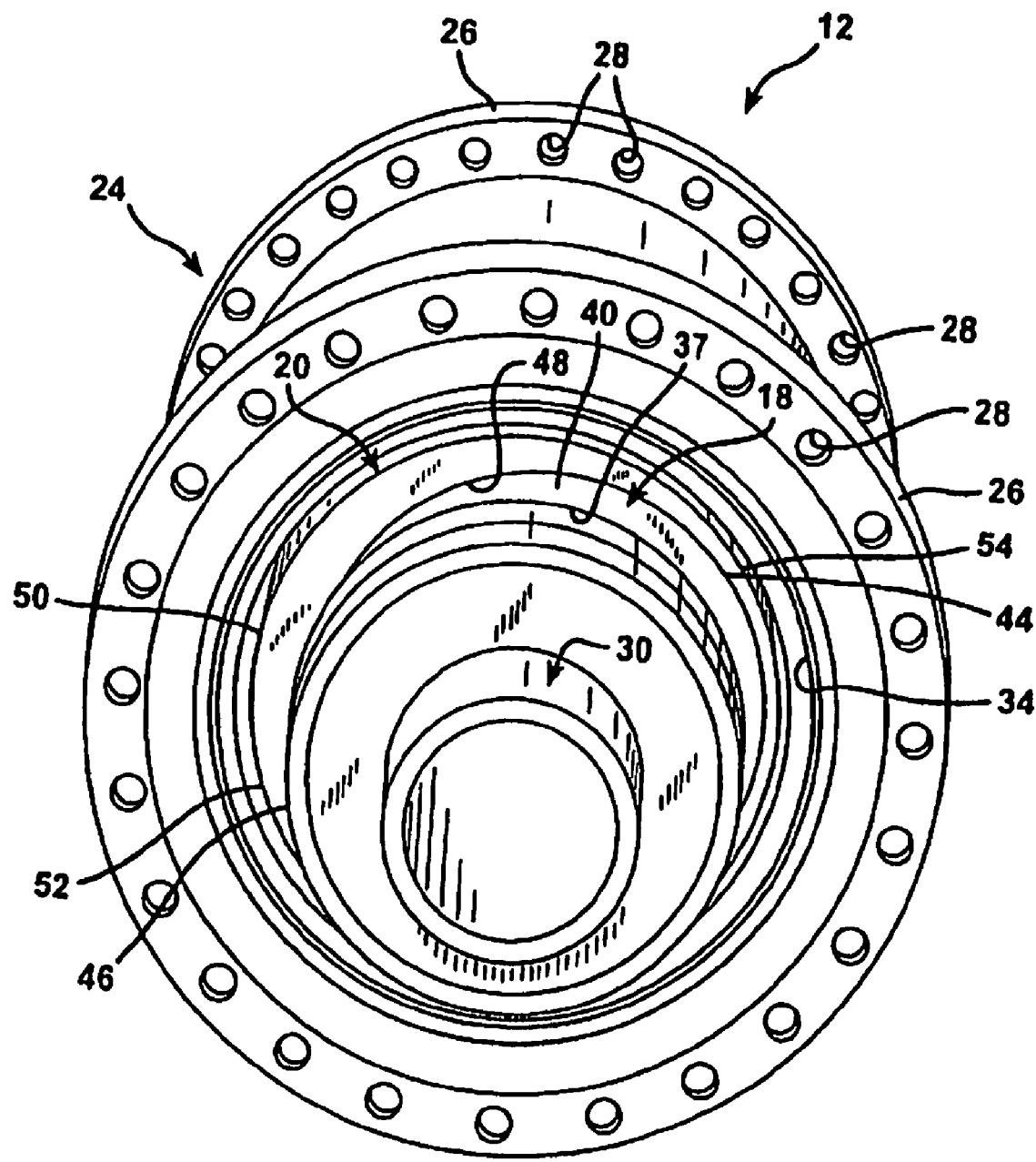
FIG. 4 is a perspective view of the component members of the driving system in the condition illustrated in FIG. 3.

As illustrated in FIGS. 3 and 4 in the absence of power applied by the rider through the bicycle pedals to the sprocket 15, the power transmission sleeve 20 is shiftable radially relative to the central drive axis 36. The drive sleeve cam lobe 44 and the power transmission sleeve cam lobe 62 can assume locations in diametrical opposition to each other. That is, the cam lobe 44 of the drive sleeve 18 can reside in the pocket 54 of the power transmission sleeve 20 and is diametrically opposite to the cam lobe 52 formed at the location of maximum width of wall thickness of the power transmission sleeve 20. In this condition the diametrical opposition of the cam lobes 44 and 52 essentially centers the power transmission sleeve 20 within the shell 24 so that a clearance gap in the cavity 32 exists between the outer surface 50 of the power transmission sleeve 20 and the hub shell liner 34 of the hub 24. That is, when the cam lobe 44 is radially aligned with the pocket 54 of the power transmission sleeve 20, a clearance exists between the power transmission sleeve outer wall surface 50 and the hub shell liner 34 of the hub cavity 32. In this condition the sprocket 15 is disengaged from the hub 12, and the bicycle travels in a "coasting" condition. During this condition the backpedal safety mechanism peg 80 carries the power transmission sleeve 20 with it to prevent the transmission sleeve 20 from engaging the hub 12 when the pedals are counterrotated.

Figure 5:
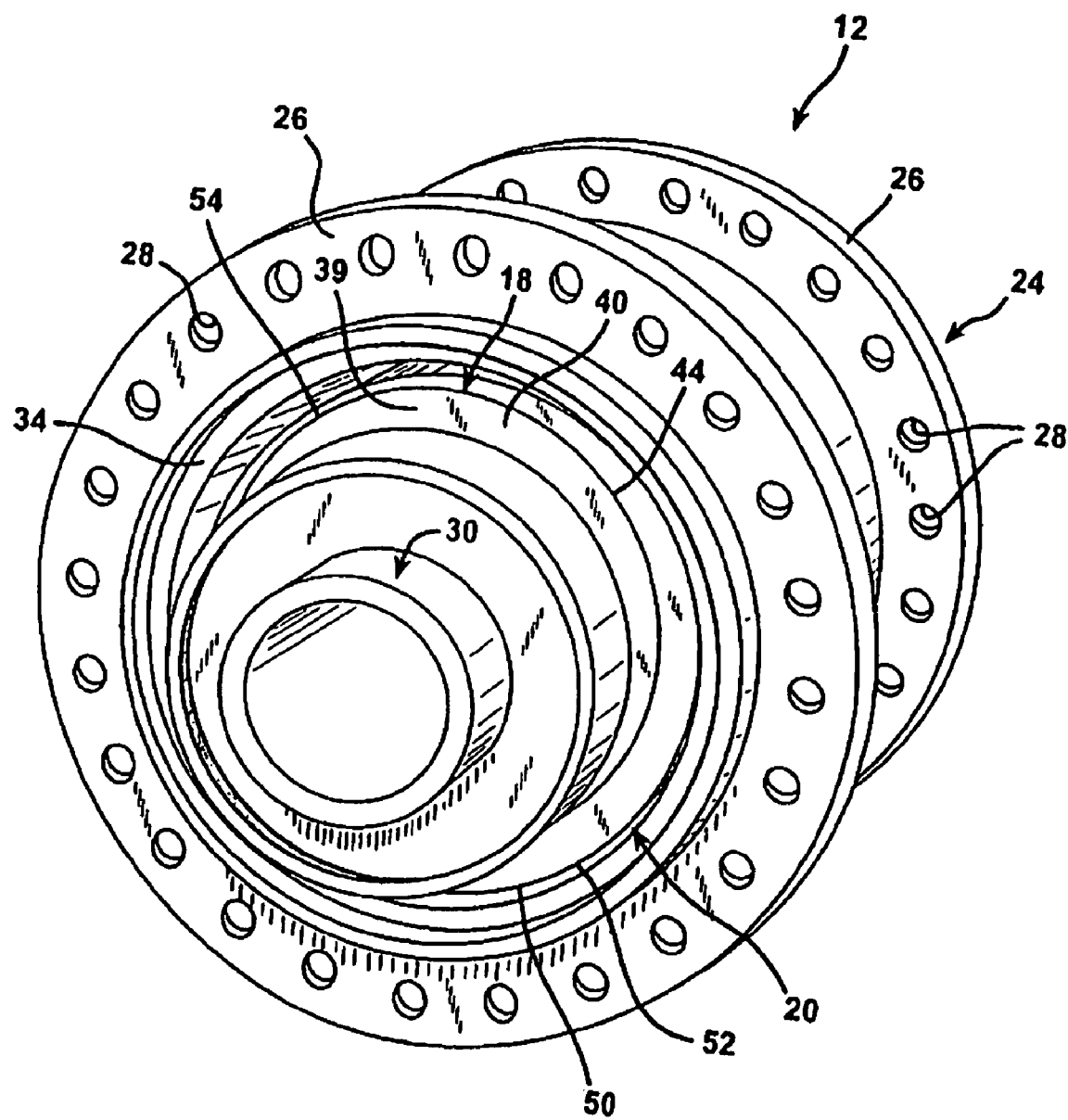
FIG. 5 is a perspective view of the component members of the driving system in the condition illustrated in FIG. 3A.

On the other hand, when the rider wishes to power the bicycle, the rider applies power strokes to the bicycle pedals, which accelerate the rotation of the sprocket 15 and also the drive sleeve 18 relative to the wheel hub 12. Since the spring washers 70 and 72 exert a light retarding force on the rotation of the power transmission sleeve 20, the lobe 44 of the drive sleeve 18 is rotated out of the pocket 54 and out of alignment in diametric opposition to the lobe 52 of the power transmission sleeve 20, as indicated in FIG. 3A. This causes the eccentric outer wall surface 40 of the drive sleeve 18 to push against the inner wall surface 48 of the power transmission sleeve 20 and shift the power transmission sleeve 20 radially relative to the drive axis 36, as illustrated in FIG. 3A. The power transmission sleeve outer wall surface 50 is thereby forced by the drive sleeve 18 into frictional engagement with the hub shell liner 34 of the hub cavity 32. That is, the power transmission sleeve 20 is shifted radially relative to the central drive axis 36 so that the power transmission cam lobe 52 on the outer wall surface 50 of the power transmission sleeve 20 engages the hub shell liner 34 while the drive sleeve cam lobe 44 on the outer wall surface 40 of the drive sleeve 18 engages the inner wall surface 48 of the power transmission sleeve 20. With the drive sleeve 18 engaged with the power transmission sleeve 20 and the power transmission sleeve 20 engaged with the hub shell 24, the hub 12 is thereby engaged with the sprocket 15, thereby rotating the rear bicycle wheel. This occurs when the cam lobes 44 and 52 depart from diametric opposition relative to each other. FIGS. 3A and 5 illustrate the drive sleeve 18 in the engaged position, driving the hub 12.

It is highly desirable to provide some system for preventing overrunning. That is, on the whole it would be undesirable for reverse pedaling to cause the mechanism to engage since such motion would cause the mechanism to lock in the engaged mode, which could be hazardous. Furthermore, it is highly desirable to provide some means for adjusting the size of the "dead spot", that is the range of motion, required to engage the drive according to the individual rider's preference. In addition, there has heretofore been no other free coaster hub available that can be installed to work on both the right and left-hand side of the bike and that has the option of driving the wheel forward and in reverse.

It is true that some riders may wish to utilize the ability of the hub to drive the wheel both forward and backward. However, it is usually desirable to provide some system for preventing this type of overrunning. That is, for most riders it would be undesirable for reverse pedaling to cause the mechanism to lock in the engaged mode, which would be hazardous in many instances.

Figure 7:
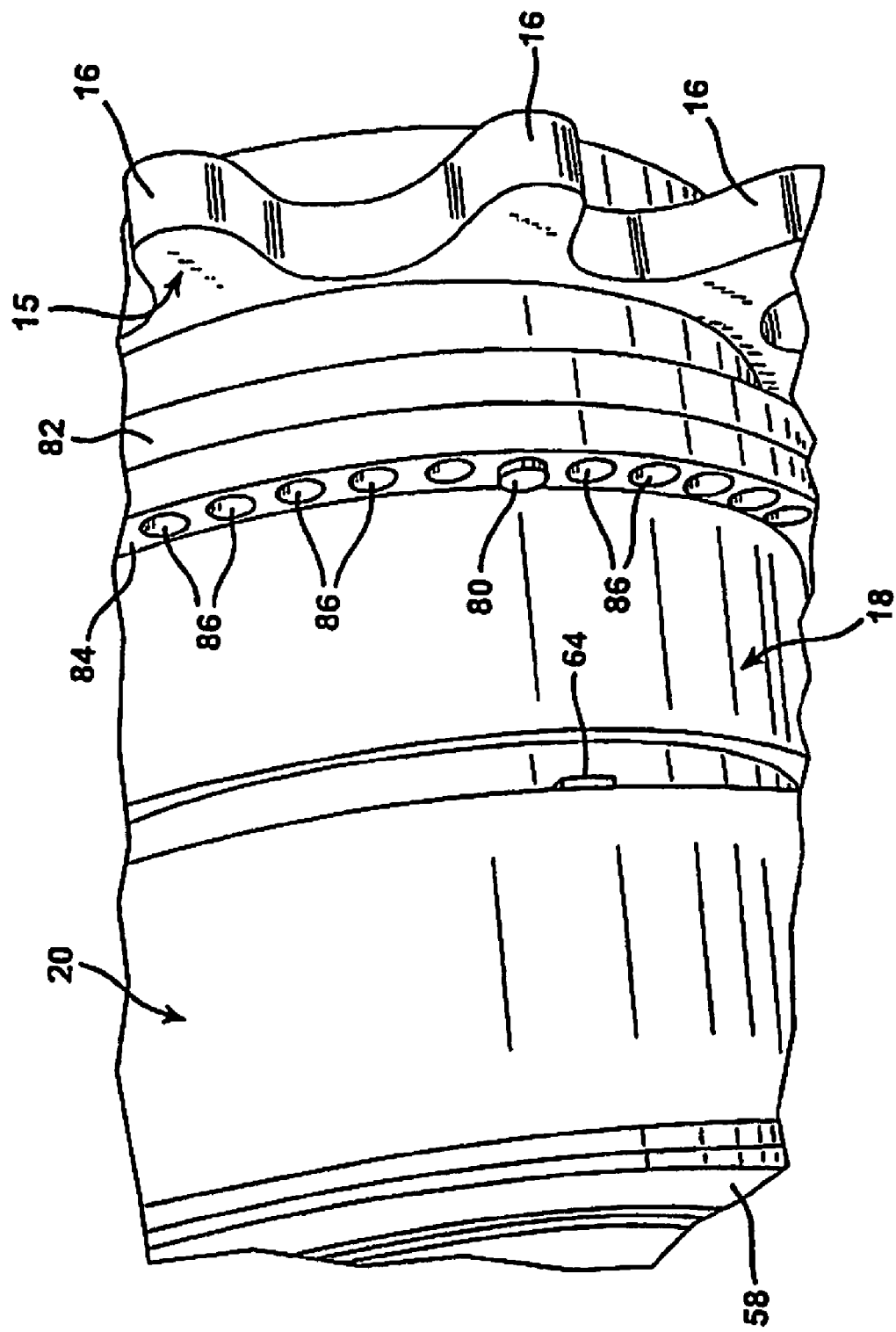
FIG. 7 is an exploded perspective detail illustrating the backpedal safety mechanism of the driving apparatus of FIGS. 1-6.

A suitable backpedal safety adjustment is achieved with the provision of a backpedal safety stud or peg 80. Preferably, the drive sleeve 18 is constructed with an annular, peg mounting ring or ledge 82 that is disposed about the drive sleeve outer wall surface 40. As illustrated in FIG. 7, the peg mounting ring 82 has an annular surface 84 facing in an inboard direction and including a plurality of peg mounting sockets 86 defined therein. The peg 80 can be selectively and alternatively mounted in any one of the peg mounting sockets 86. As illustrated in the exploded view of FIG. 7, the peg 80 is thereby directed toward the power transmission sleeve 20.

In fact, when the unit is fully assembled as illustrated in FIG. 1, the peg or stud 80 travels in a stud path of rotation about the wheel mounting shaft 30 and the backpedal catch lug or tang 64 projects longitudinally in an outboard direction into the stud path of rotation. As a result, rotation of the drive sleeve 18 in one direction of rotation, namely the clockwise direction with reference to drawing FIGS. 3, 3A, 4, and 5, carries the peg or stud 80 away from the backpedal catch tang 64. This allows the spring washers 70 and 72 of the drag mechanism 94 to operate to engage the drive sleeve 18 with the power transmission sleeve 20 and with the hub 12 for rotation together when the cam lobe 52 of the power transmission sleeve inner surface 48 departs from one hundred eighty degree opposition relative to the cam lobe 44 of the radial drive sleeve 18, as illustrated in FIGS. 3A and 5.

On the other hand, counterrotation of the drive sleeve 18 in the counterclockwise direction, as viewed in FIGS. 4 and 5, brings the stud or peg 80 into abutment with the side of the backpedal catch tang 64 as the cylindrical, eccentric drive sleeve outer surface 40 is rotated within the cylindrical, eccentric power transmission sleeve inner surface 48. The catch tang 64 begins to move in rotation about the axis 36 as soon as the rider disengages the wheel hub 12 by removing downward pressure on the pedals. When the sprocket 15 is counter-rotated, the peg 80 shifts the backpedal catch tang 64 to prevent the accidental possibility of engaging the wheel in a backward direction. That is, the drive sleeve 18 is dislodged from engagement with the power transmission sleeve 20 as the degree of offset alignment of the outer eccentric surface 50 of the power transmission sleeve 20 within the hub shell 24 is reduced, as illustrated in FIGS. 3 and 4.

In one embodiment of the invention illustrated the peg 80 is mountable alternatively in any one of the peg mounting sockets 86 so as to extend toward the power transmission sleeve 20 and parallel to the wheel mounting shaft 30. The peg sockets 86 are located at angular intervals of separation from each other about the annular, outer surface 84 of the drive sleeve 18. The peg 80 is selectively and alternatively engageable in each of the peg sockets 86. The backpedal catch tang 64 extends toward the peg mounting ring 82, parallel to the wheel mounting shaft 30. The peg 80 is thereby adjustable in position relative to the location of maximum thickness, that is the lobe 44, on the drive sleeve 18.

Another advantage of providing a plurality or even a multiplicity of peg sockets 86 about the periphery of the drive sleeve 18 is that it is a very straightforward matter to switch from a left-handed to right-handed drive simply by adjusting the angular relative positions of the drive sleeve 18 and power transmission sleeve 20. That is, with the bicycle wheel removed from between the frame dropouts, the drive sleeve 18 can be withdrawn from the power transmission sleeve 20, rotated slightly relative thereto, and moved back into a fully engaged position so that the peg 80 can strike the tang 64 on either side.

In another embodiment, the invention may further comprise a first and second power transmission sleeve 20, 21 and a first and second drive sleeve outer surface 40, 41 to form a dual or multiple cam design of the free coaster bicycle wheel driving apparatus 11.

As shown in FIG. 10 and 11, the first power transmission sleeve 20 is disposed within the hub shell liner 34, which is disposed within the hub cavity 32, and defines a first power transmission sleeve outer surface 50 and a first power transmission sleeve inner surface 48 that is eccentric relative to the first power transmission sleeve outer surface 50. The eccentric orientation of the inner and outer surfaces of the first power transmission sleeve 20 defines an area of minimum thickness referred to as the first power transmission sleeve pocket 54 and an area of maximum thickness referred to as the first power transmission sleeve cam lobe 52.

The second power transmission sleeve 21 is disposed within the hub shell liner 34, which is disposed within the hub cavity 32, and is axially offset from the plane of the first power transmission sleeve 20 and defines a second power transmission sleeve outer surface 51 and a second power transmission sleeve inner surface 49. The second power transmission sleeve outer surface 51 is eccentric to the second power transmission sleeve inner surface 49 and the first power transmission sleeve outer surface 50. The eccentric orientation between the inner and outer surface of the second power transmission sleeve 21 defines an area of minimum thickness, the second power transmission sleeve pocket 55, and an area of maximum thickness, the second power transmission sleeve cam lobe 53. In a preferred embodiment the first power transmission sleeve cam lobe 52 and the second power transmission sleeve cam lobe 53 are diametrically opposed. However, the second power transmission sleeve cam lobe 53 can have any orientation relative to the first transmission cam lobe 52.

The second power transmission sleeve 21 is movably attached to the first power transmission sleeve 20 by a connector 90. The connector 90 can be a parallelogram link. Preferably, the connector 90 is a rigid structure, such as a link pin, to keep the first and second power transmission sleeves in angular alignment, while allowing for movement in a radial direction. The link pin comprises two horizontally extending members offset from each other and connected by a vertical member. The first and second power transmission sleeves 20, 21 each further comprise a recess 92 to receive the link pin. The link pin connects the first and second power transmission sleeves 20, 21 together via the recesses 92. However, the first and second power transmission sleeves 20, 21 are movable about the axis defined by the respective horizontal member of the link pin. This allows the second power transmission sleeve 21 to move radially while still being attached to the first power transmission sleeve 20.

Preferably, the first and second power transmission sleeves 20, 21 comprise two link pins and two link pin receiving recesses 92 each. In another embodiment, the link pin recesses 92 of the first power transmission sleeve 20 are diametrically opposed and the link pin recesses 92 of the second power transmission sleeve 21 are diametrically opposed.

The first power transmission sleeve 20 is generally circular in shape. The second power transmission sleeve 21 is semi-circular with two link pin recesses 92, one at each end of the semicircle. The second power transmission sleeve pocket 55 is the gap where the other half of the semicircle would have been if it were a full circle. The second power transmission sleeve cam lobe 53 and the first power transmission sleeve cam lobe 52 are diametrically opposed. This design leaves the first power transmission sleeve cam lobe 52 exposed. The exposed portion of the first power transmission sleeve cam lobe 52 may comprise the tang 64. In another embodiment, the exposed portion of the first power transmission sleeve cam lobe 52 comprises a hole or recess 87 into which a lug or tang 64 can be removably inserted. In a preferred embodiment, the exposed portion of the first power transmission sleeve cam lobe 52 may contain a plurality of recesses 87 so that the tang 64 can be placed in a variety of positions along the first power transmission sleeve cam lobe 52.

The drive sleeve 18 of the dual cam design projects from the sprocket 15 axially toward the hub 12 and defines a first cylindrical drive sleeve outer surface 40 that is eccentric relative to the wheel mounting shaft opening 31 and a second cylindrical drive sleeve outer surface 41 that is eccentric relative to the wheel mounting shaft opening 31 and eccentric relative to the first cylindrical drive sleeve outer surface 40. The drive sleeve 18 is disposed within the first and second power transmission sleeves 20, 21, such that the first power transmission sleeve inner surface 48 abuts the first cylindrical drive sleeve outer surface 40 and the second power transmission sleeve inner surface 49 abuts the second cylindrical drive sleeve outer surface 41.

The eccentric orientation of the first and second drive sleeve outer surfaces 40, 41 relative to the wheel mounting shaft opening 31 defines areas of minimum thickness, the first and second drive sleeve pockets 46, 47, and areas of maximum thickness, the first and second drive sleeve cam lobes 44, 45, respectively.

Figure 14B:
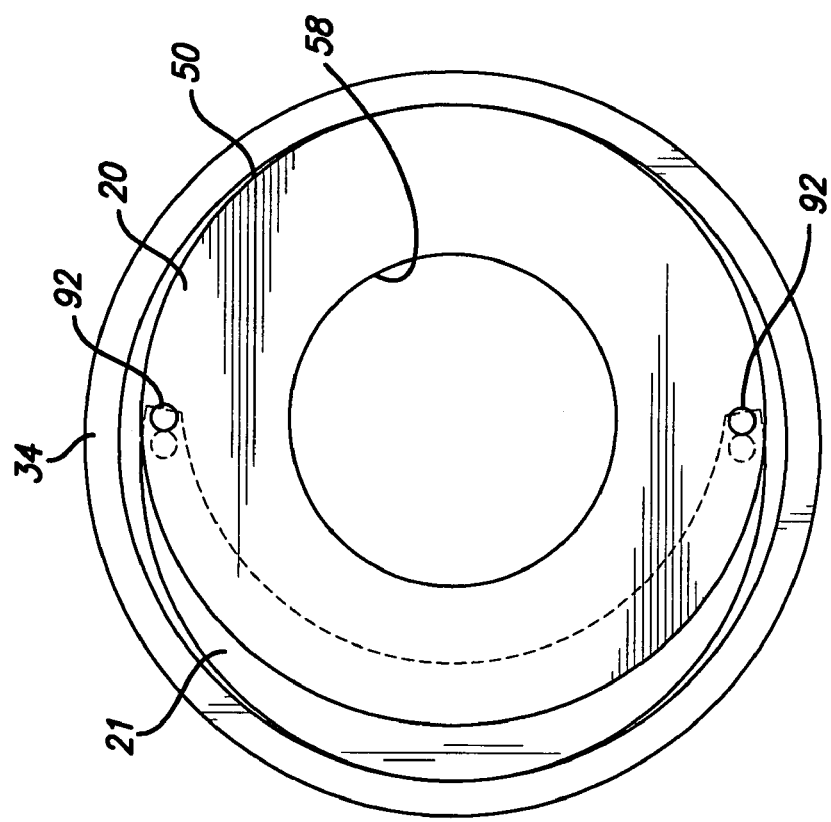
FIG. 14B is a side view of the multiple power transmission sleeves in the engaged position, without showing the drive sleeve for simplicity.
Figure 14A:
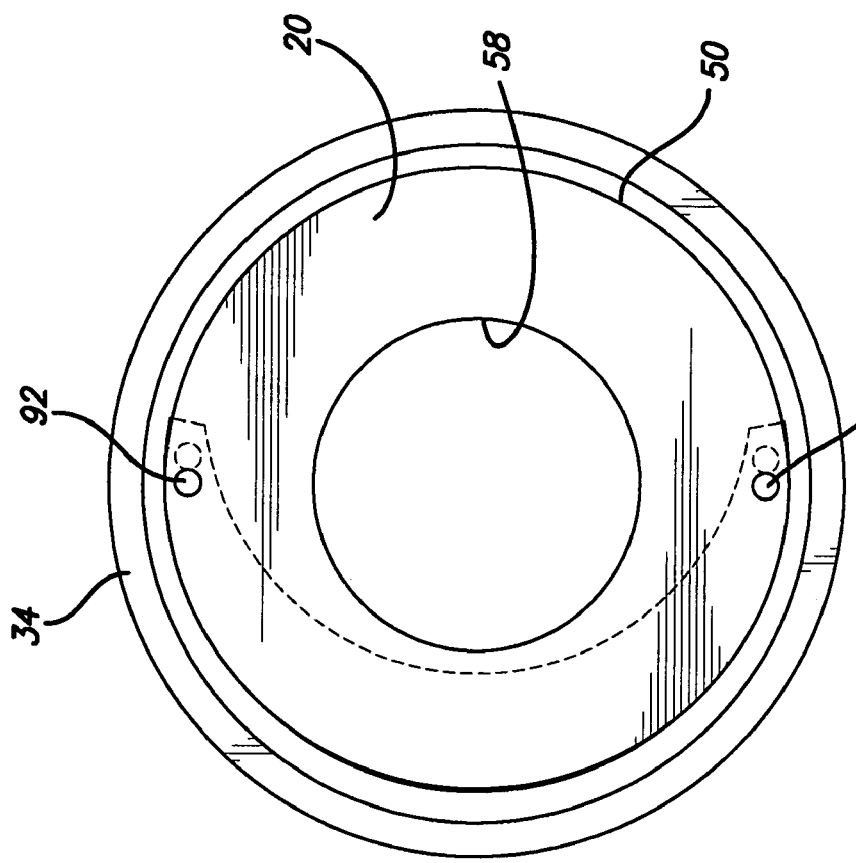
FIG. 14A is a side view of the multiple power transmission sleeves in the disengaged position, without showing the drive sleeve for simplicity.

FIGS. 14A, 14B, 15A and 15B show the engagement and disengagement process. These figures have been drawn without showing the drive sleeve and sprocket assembly for ease of viewing and description. As shown in FIGS. 10 and 11, the first drive sleeve cam lobe 44 and said second drive sleeve cam lobe 45 are relatively oriented with each other and the first power transmission sleeve cam lobe 52 and the second power transmission sleeve cam lobe 53 are relatively oriented with each other such that when the first drive sleeve cam lobe 44 approaches and engages the first power transmission sleeve cam lobe 52, the second drive sleeve cam lobe 45 also approaches and engages the second power transmission sleeve cam lobe 53. When the first and second drive sleeve cam lobes 44, 45 approach and engage the first and second power transmission sleeve cam lobe 52, 53, the first and second power transmission sleeve cam lobes 52, 53 shift radially outwards towards the wheel hub shell liner 34 and engage the wheel hub 12 for rotation together as shown in FIGS. 14B and 15B (drawn without the drive sleeve for simplicity). When the first and second drive sleeve cam lobes 44, 45 are disposed in the first and second transmission sleeve pockets 54, 55, respectively, the wheel hub 12 is allowed to freewheel as shown in FIGS. 14A and 15A (drawn without the drive sleeve for simplicity).

The drive sleeve 18 is provided with a backpedal safety stud 80 at the second drive sleeve outer surface that is closes to the sprocket 15. The backpedal safety stud 80 projects towards the first power transmission sleeve 20 and travels in a stud path of rotation about the wheel mounting shaft 30. The first power transmission sleeve 20 is provided with a backpedal catch tang 64 that projects into said stud path of rotation, whereby rotation of the drive sleeve 18 in one direction of rotation relative to the first and second power transmission sleeve 20, 21 carries the stud 80 away from the backpedal catch tang 64. This allows the drag mechanism 22 to operate and allow the first and second drive sleeve cam lobes 44, 45 to approach and engage the first and second power transmission sleeve cam lobes 52, 53, respectively, allowing the first and second power transmission sleeves 20, 21 to be shifted radially outward to engage the hub 12 so that the drive sleeve 18, the first and second power transmission sleeves 20, 21, and the hub 12 rotate together. Counterrotation of the drive sleeve 18 brings the stud 80 into abutment with the backpedal catch tang 64 and brings the first and second drive sleeve cam lobes 44, 45 into the first and second power transmission sleeve pockets 54, 55, thereby creating a distance of separation between first and second power transmission sleeve outer surfaces 50, 51 and hub 12.

In embodiments with more than one power transmission sleeve 20, 21 and more than one drive sleeve outer surface 40, 41, the peg mounting ring 82, as shown in FIG. 7, is preferably on the cam lobe surface 45 of the drive sleeve 18.

In another preferred embodiment the free coaster bicycle wheel driving apparatus 11 may be comprised of a plurality of power transmission sleeves 20, 21 disposed within said hub cavity 32 and a drive sleeve 18 comprising a plurality of drive sleeve outer surfaces 40, 41 corresponding with each power transmission sleeve 20, 21.

The plurality of power transmission sleeves 20, 21 define a plurality of power transmission sleeve outer surfaces 50, 51 and a plurality of corresponding power transmission sleeve inner surfaces 48, 49 that are eccentric relative to the plurality of respective power transmission sleeve outer surfaces 50, 51. The plurality of power transmission sleeves 20, 21 are movably attached to each other with a plurality of link pins 90 and are axially offset from each other.

The drive sleeve 18 projects from the sprocket 15 axially toward the hub 12 and defines a plurality of cylindrical drive sleeve outer surfaces that are eccentric relative to the wheel mounting shaft opening 31 and to each other. The plurality of cylindrical drive sleeve outer surfaces 40 are disposed within the plurality of power transmission sleeves 20, such that each power transmission sleeve inner surface 48 abuts a corresponding cylindrical drive sleeve outer surface 40.

Each drive sleeve outer surface 40, 41 defines their respective drive sleeve cam lobes 44, 45 and each power transmission sleeve outer surface 50, 51 defines their respective power transmission sleeve cam lobes 52, 53. The drive sleeve cam lobes 44, 45 are relatively oriented with each other, and the power transmission sleeve cam lobes 52, 53 are relatively oriented with each other, such that rotation of the drive sleeve cam lobes 44, 45 causes synchronous departure of the drive sleeve cam lobes 44, 45 from diametric opposition relative to the corresponding power transmission sleeve cam lobes 52, 53. When the drive sleeve cam lobes 44, 45 depart from diametric opposition relative to the corresponding power transmission sleeve cam lobes 52, 53 the corresponding power transmission sleeve cam lobes 52, 53 move radially outwards towards the wheel hub shell 24, thereby engaging the wheel hub 12.

In embodiments with a plurality of power transmission sleeves 20, 21 and a plurality of drive sleeve outer surfaces 40, 41 the backpedal safety stud 80 is preferably mounted on the cam lobe surface 45 of the drive sleeve 18 and projects axially towards the first power transmission sleeve 20. The backpedal catch tang 64 is preferably mounted on the power transmission sleeve 20 that is farthest from the drive sleeve 18 and projects into the stud path of rotation. The cylindrically outwardly projecting stud mounting ring 82 of FIG. 7 is preferably on the cam lobe surface 45 of the drive sleeve 18.

As shown in FIG. 12, a variety of internal thrust washers 106, external axle washers 107 and c-clips 108 are provided for axial location, and to help secure the parts.

Undoubtedly, numerous variations and modifications of the invention will become readily apparent to those familiar with bicycle clutch and wheel hub assemblies. Accordingly, the scope of the invention should not be construed as limited to the specific embodiments depicted and described, but rather is defined in the claims appended hereto.

INDUSTRIAL APPLICABILITY

This invention may be industrially applied to the development, manufacture, and use of bicycle hub drive systems with a clutch that allows a bicycle rider to easily engage and disengage the hub drive system of the bicycle.

What is claimed:

1. A bicycle wheel hub assembly comprising:
  (a) a wheel hub formed with a wheel hub shell disposed coaxially about a wheel mounting shaft, whereby said wheel hub shell is journaled for rotation about said wheel mounting shaft and a cylindrical annular hub cavity is defined therebetween;
  (b) a first power transmission sleeve disposed within said hub cavity and defining a first power transmission sleeve outer surface and a first power transmission sleeve inner surface that is eccentric relative to said first power transmission sleeve outer surface;
  (c) a second power transmission sleeve disposed within said hub cavity and defining a second power transmission sleeve outer surface and a second power transmission sleeve inner surface that is eccentric relative to said second power transmission sleeve outer surface, wherein said second power transmission sleeve is movably attached to said first power transmission sleeve;
  (d) a sprocket having sprocket teeth projecting radially relative to a drive axis, with a central cylindrical wheel mounting shaft opening defined through said sprocket to receive said wheel mounting shaft coaxially therewithin;
  (e) a drive sleeve projecting from said sprocket axially toward said hub and defining a first cylindrical drive sleeve outer surface that is eccentric relative to said wheel mounting shaft opening and a second cylindrical drive sleeve outer surface that is eccentric relative to said wheel mounting shaft opening and eccentric relative to said first cylindrical drive sleeve outer surface, and said drive sleeve is disposed within said first and second power transmission sleeves, such that said first power transmission sleeve inner surface abuts said first cylindrical drive sleeve outer surface and said second power transmission sleeve inner surface abuts said second cylindrical drive sleeve outer surface; and
  (f) a drag mechanism mounted on said wheel mounting shaft to retard rotation of said first and second power transmission sleeves relative to said drive sleeve.

2. A bicycle wheel hub assembly according to claim 1 wherein
  (a) said first drive sleeve outer surface defines a first drive sleeve cam lobe;
  (b) said second drive sleeve outer surface defines a second drive sleeve cam lobe;
  (c) said first power transmission sleeve outer surface defines a first power transmission sleeve cam lobe and a first power transmission sleeve pocket;
  (d) said second power transmission sleeve outer surface defines a second power transmission sleeve cam lobe and a second power transmission sleeve pocket;
  (e) wherein said first drive sleeve cam lobe and said second drive sleeve cam lobe are relatively oriented with each other and said first power transmission sleeve cam lobe and said second power transmission sleeve cam lobe are relatively oriented with each other such that when said first drive sleeve cam lobe approaches and engages said first power transmission sleeve cam lobe, said second drive sleeve cam lobe also approaches and engages said second power transmission sleeve cam lobe, and wherein when said first and second drive sleeve cam lobes approach and engage said first and second power transmission sleeve cam lobes, respectively, said first and second power transmission sleeve cam lobes move radially outward toward said wheel hub shell and engage said wheel hub.

3. A bicycle wheel hub assembly according to claim 2 wherein said first power transmission sleeve and said second power transmission sleeve are connected by a link pin, whereby said link pin keeps said first power transmission sleeve and said second power transmission sleeve in angular alignment while allowing for movement in a radial direction.

4. A bicycle wheel hub assembly according to claim 2 wherein
  (a) said drive sleeve is provided with a backpedal safety stud at said second drive sleeve outer surface projecting towards said first power transmission sleeve, wherein said backpedal safety stud travels in a stud path of rotation about said wheel mounting shaft and
  (b) said first power transmission sleeve is provided with a backpedal catch tang that projects into said stud path of rotation, whereby rotation of said drive sleeve in one direction of rotation relative to said first and second power transmission sleeve carries said stud away from said backpedal catch tang, thereby allowing said drag mechanism to operate to allow said first and second drive sleeve cam lobes to approach and engage said first and second power transmission sleeve cam lobes, respectively, allowing the first and second power transmission sleeves to be shifted radially outward to engage said hub for rotation together, and counterrotation of said drive sleeve brings said stud into abutment with said backpedal catch tang and brings said first and second drive sleeve cam lobes into said first and second power transmission sleeve pockets, thereby creating a distance of separation between said first and second power transmission sleeve outer surfaces and said hub.

5. A bicycle wheel hub assembly according to claim 4 wherein said drive sleeve is provided with a cylindrical inwardly projecting stud mounting ring on said second drive sleeve outer surface facing said first power transmission sleeve, and said stud mounting ring has a plurality of different stud sockets defined therein and angularly offset from each other, and said stud is selectively releasable and alternatively positionable in said different stud sockets.

6. A bicycle wheel hub assembly according to claim 1 wherein said drag mechanism is comprised of at least one annular spring washer mounted on said wheel mounting shaft and compressed axially against said first power transmission sleeve.

7. A bicycle wheel hub assembly according to claim 6 further comprising at least one shim washer disposed on said wheel mounting shaft to increase compressive axial force on said spring washer.

8. A bicycle wheel hub assembly according to claim 1 wherein said first power transmission sleeve is a cup-shaped member with an annular flange directed radially inwardly from said first outer surface thereof, and having opposing surfaces facing in opposite axial directions, and said drag mechanism is comprised of a pair of opposing annular spring washers compressed against said opposing surfaces of said flange.

9. A bicycle wheel hub assembly comprising:
(a) a wheel hub formed with a wheel hub shell disposed coaxially about a wheel mounting shaft, whereby said wheel hub shell is journaled for rotation about said wheel mounting shaft and a cylindrical annular hub cavity is defined therebetween;
(b) a plurality of power transmission sleeves disposed within said hub cavity and defining a plurality of power transmission sleeve outer surfaces and a plurality of corresponding power transmission sleeve inner surfaces that are eccentric relative to said plurality of respective power transmission sleeve outer surfaces, wherein said plurality of power transmission sleeves are movably attached to each other;
(c) a sprocket having sprocket teeth projecting radially relative to a sprocket axis, with a central cylindrical wheel mounting shaft opening defined through said sprocket to receive said wheel mounting shaft coaxially therewithin;
(d) a drive sleeve projecting from said sprocket axially toward said hub and defining a plurality of cylindrical drive sleeve outer surfaces that are eccentric relative to said drive shaft opening and to each other, and said plurality of cylindrical drive sleeve outer surfaces are disposed within said plurality of power transmission sleeves, such that each power transmission sleeve inner surface abuts a corresponding cylindrical drive sleeve outer surface; and
(e) a drag mechanism mounted on said wheel mounting shaft to retard rotation of said plurality of power transmission sleeves relative to said drive sleeve.

10. A bicycle wheel hub assembly according to claim 9 wherein
(a) said plurality of drive sleeve outer surfaces define a plurality of corresponding drive sleeve cam lobes;
(b) said plurality of power transmission sleeve outer surfaces define a corresponding plurality of power transmission sleeve cam lobes;
(c) wherein said plurality of drive sleeve cam lobes are relatively oriented with each other and said plurality of power transmission sleeve cam lobes are relatively oriented with each other such that rotation of said plurality of drive sleeve cam lobes causes synchronous departure of said plurality of drive sleeve cam lobes from diametric opposition relative to said corresponding plurality of power transmission sleeve cam lobes; and
(d) when said plurality of drive sleeve cam lobes depart from diametric opposition relative to said corresponding power transmission sleeve cam lobes, said corresponding power transmission sleeve cam lobes move radially towards said wheel hub shell, thereby engaging said wheel hub.

11. A bicycle wheel hub assembly according to claim 10 wherein said plurality of power transmission sleeves are connected by a plurality of link pins, whereby said plurality of link pin keep said plurality of power transmission sleeves in angular alignment while allowing for movement in a radial direction.

12. A bicycle wheel hub assembly according to claim 10 wherein
(a) said drive sleeve is provided with a backpedal safety stud at the last drive sleeve outer surface closest to said sprocket and projecting axially towards a first power transmission sleeve, wherein said backpedal safety stud travels in a stud path of rotation about said wheel mounting shaft and
(b) said first power transmission sleeve is provided with a backpedal catch tang that projects into said stud path of rotation, whereby rotation of said drive sleeve in one direction of rotation relative to said plurality of power transmission sleeves carries said stud away from said backpedal catch tang, thereby allowing said drag mechanism to operate to engage said drive sleeve, said plurality of power transmission sleeves, and said hub for rotation together when said plurality of power transmission sleeve cam lobes depart from diametric opposition relative to said corresponding plurality of drive sleeve cam lobes, and counterrotation of said drive sleeve brings said stud into abutment with said backpedal catch tang creating a distance of separation between said plurality of power transmission sleeve outer surfaces and said hub.

13. A bicycle wheel hub assembly according to claim 12 wherein said drive sleeve is provided with a cylindrical outwardly projecting stud mounting ring on said last drive sleeve outer surface facing said plurality of power transmission sleeves, and said stud mounting ring has a plurality of different stud sockets defined therein and angularly offset from each other, and said stud is selectively releasable and alternatively positionable in said different stud sockets.

14. A bicycle wheel hub assembly according to claim 9 wherein said drag mechanism is comprised of at least one annular spring washer mounted on said wheel mounting shaft and compressed axially against a first power transmission sleeve.

15. A bicycle wheel hub assembly according to claim 14 further comprising at least one shim washer disposed on said wheel mounting shaft to increase compressive axial force on said spring washer.

16. A bicycle wheel hub assembly according to claim 9 wherein a first power transmission sleeve is a cup-shaped member with an annular flange directed radially inwardly from said first outer surface thereof, and having opposing surfaces facing in opposite axial directions, and said drag mechanism is comprised of a pair of opposing annular spring washers compressed against said opposing surfaces of said flange.

* * * * *